(12) United States Patent
Howells et al.

(10) Patent No.: US 9,546,829 B2
(45) Date of Patent: *Jan. 17, 2017

(54) BRAZING SHEET CORE ALLOY FOR HEAT EXCHANGER

(71) Applicant: NOVELIS INC., Atlanta, GA (US)

(72) Inventors: Andrew D. Howells, Kingston (CA); Hany Ahmed, Atlanta, GA (US); Kevin Michael Gatenby, Johns Creek, GA (US); Jyothi Kadali, Atlanta, GA (US); Pierre Henri Marois, Kingston (CA)

(73) Assignee: Novelis Inc., Atlanta, GA (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/206,058

(22) Filed: Mar. 12, 2014

(65) Prior Publication Data
US 2014/0272460 A1    Sep. 18, 2014

Related U.S. Application Data

(60) Provisional application No. 61/779,149, filed on Mar. 13, 2013, provisional application No. 61/883,461, filed on Sep. 27, 2013.

(51) Int. Cl.
*F28F 21/08* (2006.01)
*C22C 21/00* (2006.01)
(Continued)

(52) U.S. Cl.
CPC .......... *F28F 21/084* (2013.01); *B22D 11/003* (2013.01); *B22D 11/007* (2013.01);
(Continued)

(58) Field of Classification Search
CPC ................ Y10T 428/12764; Y10T 428/12736; Y10T 428/12583; Y10T 428/1241; Y10T 428/12417; Y10T 428/12396; Y10T 428/12375; Y10T 428/12354; Y10T 428/13; C22C 21/00; B32B 15/016; B32B 15/017; B32B 15/043; B32B 15/20
See application file for complete search history.

(56) References Cited

U.S. PATENT DOCUMENTS

| | | | |
|---|---|---|---|
| 4,235,628 | A | 11/1980 | Althoff et al. |
| 4,649,087 | A | 3/1987 | Scott et al. |

(Continued)

FOREIGN PATENT DOCUMENTS

| | | |
|---|---|---|
| EP | 718072 | 6/1996 |
| EP | 712681 | 2/2000 |

(Continued)

OTHER PUBLICATIONS

U.S. Appl. No. 14/206,133, Non-Final Office Action, mailed Apr. 23, 2015, 10 pages.

(Continued)

*Primary Examiner* — Michael E La Villa
(74) *Attorney, Agent, or Firm* — Kilpatrick Townsend & Stockton, LLP

(57) ABSTRACT

The present invention provides a new aluminum alloy material which may be used for a core alloy of a corrosion-resistant brazing sheet. This core alloy displays with high strength, and good corrosion resistance for use in heat exchangers. This aluminum alloy material was made by direct chill (DC) casting. The present inventions also provides corrosion-resistant brazing sheet packages including the aluminum alloy material as a core and one or more cladding layers.

23 Claims, 13 Drawing Sheets

(51) Int. Cl.
    B32B 15/01    (2006.01)
    B23K 35/02    (2006.01)
    B22D 11/00    (2006.01)
    C22C 21/02    (2006.01)
    C22C 21/10    (2006.01)

(52) U.S. Cl.
    CPC ........ *B23K 35/0238* (2013.01); *B32B 15/016* (2013.01); *C22C 21/00* (2013.01); *C22C 21/02* (2013.01); *C22C 21/10* (2013.01); *Y10T 428/1241* (2015.01); *Y10T 428/12354* (2015.01); *Y10T 428/12375* (2015.01); *Y10T 428/12396* (2015.01); *Y10T 428/12417* (2015.01); *Y10T 428/12583* (2015.01); *Y10T 428/12736* (2015.01); *Y10T 428/12764* (2015.01); *Y10T 428/13* (2015.01)

(56) References Cited

U.S. PATENT DOCUMENTS

| | | | |
|---|---|---|---|
| 5,037,707 | A | 8/1991 | Fortin et al. |
| 5,041,343 | A | 8/1991 | Fortin et al. |
| 6,019,939 | A | 2/2000 | Gray et al. |
| 6,261,706 | B1 | 7/2001 | Fukuda et al. |
| 6,294,272 | B2 | 9/2001 | Söntgerath et al. |
| 6,403,232 | B1 | 6/2002 | Okamoto et al. |
| 6,451,453 | B1 | 9/2002 | Kucza et al. |
| 7,225,932 | B2 | 6/2007 | Gencer |
| 7,226,669 | B2 | 6/2007 | Benedictus et al. |
| 7,387,844 | B2 | 6/2008 | Ueda et al. |
| 7,407,714 | B2 | 8/2008 | Haller et al. |
| 7,514,155 | B2 | 4/2009 | Benedictus et al. |
| 7,608,345 | B2 | 10/2009 | Bürger et al. |
| 8,247,082 | B2 | 8/2012 | Ueda et al. |
| 8,247,083 | B2 | 8/2012 | Izumi et al. |
| 8,247,084 | B2 | 8/2012 | Kimura et al. |
| 2001/0010866 | A1 | 8/2001 | Sontgerath et al. |
| 2002/0034653 | A1 | 3/2002 | Okamoto et al. |
| 2003/0029529 | A1 | 2/2003 | Ren |
| 2003/0121572 | A1 | 7/2003 | Kucza et al. |
| 2005/0011630 | A1 | 1/2005 | Anderson et al. |
| 2005/0064226 | A1 | 3/2005 | Benedictus et al. |
| 2005/0221111 | A1 | 10/2005 | Ekstrom et al. |
| 2006/0231170 | A1 | 10/2006 | Parson et al. |
| 2007/0122648 | A1 | 5/2007 | Vieregge et al. |
| 2008/0003451 | A1 | 1/2008 | Suzuki et al. |
| 2009/0020585 | A1 | 1/2009 | Fukumoto et al. |
| 2011/0287276 | A1 | 11/2011 | Izumi et al. |
| 2012/0129003 | A1 | 5/2012 | Ando et al. |
| 2014/0272461 | A1 | 9/2014 | Marois et al. |

FOREIGN PATENT DOCUMENTS

| | | |
|---|---|---|
| EP | 2075083 | 7/2009 |
| EP | 2177638 | 4/2010 |
| EP | 2253726 | 11/2010 |
| EP | 1730320 | 5/2011 |
| EP | 2431121 | 3/2012 |
| EP | 2435207 | 4/2012 |
| EP | 1580286 | 5/2013 |
| JP | H08 283891 A | 10/1996 |
| JP | H09-095749 A | 4/1997 |
| JP | H11-293372 A | 10/1999 |
| JP | 2000-202682 A | 7/2000 |
| JP | 2006-015376 A | 1/2006 |
| JP | 2006-144041 A | 6/2006 |
| JP | 2010-209445 A | 9/2010 |
| JP | 2011-219831 A | 11/2011 |
| WO | 9422633 | 10/1994 |
| WO | 2006041518 | 4/2006 |
| WO | 2010132018 | 11/2010 |

OTHER PUBLICATIONS

U.S. Appl. No. 14/206,133, Final Office Action, mailed Aug. 13, 2015, 10 pages.
PCT/US2014/024142, "Invitation to Pay Additional Search Fees and Partial Search Report", Jun. 24, 2014, 5 pages.
PCT/US2014/024142, "International Search Report and Written Opinion", Oct. 6, 2014, 14 pages.
U.S. Appl. No. 14/206,133, Non-Final Office Action, mailed Mar. 12, 2014, 25 pages.
Matweb, "Aluminum 4045", downloaded from www.matweb.com on Sep. 30, 2014, 2 pages.
The Aluminum Association, "International Alloy Designations and Chemical Composition Limits for Wrought Aluminum and Wrought Aluminum Alloys," published by The Aluminum Association, revised Feb. 2009.
U.S. Appl. No. 14/206,133, Advisory Action, mailed Nov. 25, 2015, 7 pages.
U.S. Appl. No. 14/206,133, Non-Final Office Action, mailed Dec. 4, 2015, 10 pages.
U.S. Appl. No. 14/206,133, Final Office Action mailed Jun. 8, 2016, 9 pages.
U.S. Appl. No. 14/206,133, Advisory Action mailed Aug. 1, 2016, 6 pages.
Japanese Patent Application No. 2016-501429, Office Action dated Oct. 25, 2016.

(a)

(b)

(c)

BRAZING SHEET CORE ALLOY FOR HEAT EXCHANGER

CROSS-REFERENCE TO PRIORITY APPLICATIONS

This application claims priority to U.S. Provisional Application No. 61/779,149, filed Mar. 13, 2013, and U.S. Provisional Application No. 61/883,461, filed Sep. 27, 2013, which are incorporated herein by reference in their entireties.

FIELD OF THE INVENTION

The present invention provides a novel alloy. In one embodiment, this new alloy can be used as a core alloy in combination with clad layers for use as a corrosion resistant brazing sheet package for use in manufacturing tubing. The invention further relates to use of the tubing in heat exchangers.

BACKGROUND

Metal tubing used in heat exchangers is prone to exhibit corrosion over time. To address this problem, some commercially available forms of tubing are made from a zincated microport extrusion. In this process, the microport tubes are usually sprayed with pure zinc as the tubes exit the extrusion press. However, the coverage of the tubes with zinc can be inconsistent and the tubes are expensive to produce. Furthermore, these extrusions can exhibit low strength in the post braze condition. Alternative alloys for use in preparing the tubing are desirable.

The long life (LL) core alloy is known in the prior art and is disclosed in U.S. Pat. No. 6,019,939. This LL core alloy contains the following elements, all expressed in weight percent (wt %): not more than 0.15% Si; not more than 0.4% Fe; up to 0.1% Ti; 0.5-1.0% Cu; 0.7-1.5% Mn; up to 0.8% Mg; up to 0.3% V and/or up to 0.3% Cr. Studies have shown that the LL core alloy disclosed in U.S. Pat. No. 6,019,939 suffers from perforation and failure after 3 weeks in accelerated airside corrosion tests. Thus, there is a need for a brazing sheet core alloy with high strength, corrosion resistance and scrap metal absorbing tolerance for use in heat exchanger applications, for example automotive heat exchangers. The use of more alternative metals containing Fe and Si in the input metal for formation of the alloy can reduce cost and increase recycling capacity.

SUMMARY

The present invention provides new aluminum alloy compositions which display higher strength, corrosion resistance and can accept alternative metal input compared to previous alloys. This alloy is particularly useful as a core alloy in brazing sheet. By accepting braze scrap as an input metal, this alloy is more environmentally friendly and cost-effective. This alloy was made by direct chill (DC) casting.

In contrast to the LL core alloy disclosed in U.S. Pat. No. 6,019,939, the core alloys of the present invention contain the following elements in some embodiments, all in weight %: 0.03-0.5% Si, 0.5-1.1% Cu, 0.001-0.20% Ti, 0.15-0.55% Fe, 0-0.35% Mg, 1.3-1.80% Mn, up to 0.15% of impurities, remainder aluminum.

In another embodiment, the core alloy comprises about 0.04-0.4% Si, 0.5-1.0% Cu, 0.005-0.15% Ti, 0.20-0.50% Fe, 0-0.29% Mg, 1.4-1.70% Mn, up to 0.15% of impurities, remainder Al.

In still another embodiment, the core alloy comprises about 0.05-0.34% Si, 0.5-0.95% Cu, 0.01-0.15% Ti, 0.25-0.45% Fe, 0-0.27% Mg, 1.45-1.65% Mn, up to 0.15% of impurities, remainder Al.

In another embodiment, the core alloy comprises about 0.16-0.5% Si, 0.5-1.1% Cu, 0.001-0.20% Ti, 0.15-0.55% Fe, 0-0.35% Mg, 1.3-1.80% Mn, up to 0.15% of impurities, remainder aluminum, In yet another embodiment, the core alloy comprises about 0.16-0.4% Si, 0.5-1.0% Cu, 0.005-0.15% Ti, 0.20-0.50% Fe, 0-0.29% Mg, 1.4-1.70% Mn, up to 0.15% of impurities, remainder Al.

In still another embodiment, the core alloy comprises about 0.16-0.4% Si, 0.5-1.0% Cu, 0.005-0.15% Ti, 0.20-0.40% Fe, 0-0.29% Mg, 1.4-1.70% Mn, up to 0.15% of impurities, remainder Al.

In another embodiment, the core alloy comprises about 0.16-0.34% Si, 0.5-0.95% Cu, 0.01-0.15% Ti, 0.25-0.45% Fe, 0-0.27% Mg, 1.45-1.65% Mn, up to 0.15% of impurities, remainder Al.

In yet another embodiment, the core alloy comprises about 0.2-0.5% Si, 0.52-0.80% Cu, 0.11-0.20% Ti, 0.25-0.55% Fe, 0-0.2% Mg, 1.51-1.80% Mn, up to 0.15% of impurities, remainder Al.

In still another embodiment, the core alloy comprises about 0.2-0.5% Si, 0.52-0.75% Cu, 0.11-0.20% Ti, 0.25-0.55% Fe, 0-0.2% Mg, 1.51-1.80% Mn, up to 0.15% of impurities, remainder Al.

In yet another embodiment, the core alloy comprises about 0.2-0.4% Si, 0.52-0.7% Cu, 0.11-0.18% Ti, 0.25-0.55% Fe, 0-0.2% Mg, 1.51-1.75% Mn, up to 0.15% of impurities, remainder Al.

In another embodiment, the core alloy comprises up to 0.25% Si, 0.15-0.55% Fe, 0.5-0.6% Cu, 1.4-1.6% Mn, 0.06-0.14% Mg, up to 0.05% Cr, up to 0.04% Zn, 0.1-0.2% of Ti, up to 0.05% of Sr, up to 0.15% of impurities, and the balance aluminum.

In yet another embodiment, the core alloy comprises 0.16-0.25% Si, 0.15-0.55% Fe, 0.5-0.6% Cu, 1.4-1.6% Mn, 0.06-0.3% Mg, up to 0.05% Cr, up to 0.04% Zn, 0.1-0.2% of Ti, up to 0.05% of Sr, up to 0.15% of impurities, and the balance aluminum.

In still another embodiment, the core alloy comprises 0.16-0.25% Si, 0.15-0.55% Fe, 0.5-0.6% Cu, 1.4-1.6% Mn, 0.0-0.3% Mg, up to 0.05% Cr, up to 0.04% Zn, 0.1-0.2% Ti, up to 0.05% Sr, up to 0.15% of impurities, and the balance aluminum.

In all these embodiments shown above, there is no intentionally added Zr, V or Cr, expect for impurities found in scrap input metal. Such impurities may be 0% or below 0.05%, below 0.04%, below 0.03%, or below 0.02%, provided the sum of all impurities is not more than 0.15%.

It is to be understood that whenever a range is provided for an element in an alloy that the amount of that element could be the upper limit or the lower limit of the range or any amount between the upper limit or the lower limit of the range.

When compared to the LL core alloy, the core alloys of the present invention have a higher upper limit of Si (0.5%), Fe (0.55%) and Ti (0.20%).

The alloys of the present invention have attractive properties in the post braze condition. Specifically, higher post braze strength and improved air side corrosion resistance were obtained in the post braze condition while providing a more environmentally friendly alloy that is able to tolerate a wider range of metal inputs. An increase in post braze yield strength by about 10% compared to the LL core alloy which contained lower Si, not more than 0.15%, and Fe content, not more than 0.4%, as described in U.S. Pat. No. 6,019,939 was observed. In addition, an improved airside corrosion resistance was observed wherein the baseline sample LL core alloy experienced perforation and failure after 3 weeks in SWAAT testing while the newly developed material withstood 4 weeks without failure. This alloy provides an improvement to heat exchangers and specifically improves radiator tube stock performance.

The results demonstrate that the higher Si content in this alloy leads to formation of AlMnSi dispersoids resulting in dispersoid strengthening of the matrix. The results also show that the presence of Si leads to formation of an effective dense precipitate band (DPB), even at high Si content up to 0.4%, during brazing which leads to improved post braze corrosion resistance. Although the DPB may not be visible at high % Si, the evidence of its presence via corrosion resistance in the SWAAT airside corrosion test is clear. Glow discharge optical emission spectroscopy (GD-OES) was used to examine the variation in Si concentration profiles in the DPB region for samples containing different Si levels in the core (alloys H, I, J and K). Comparable Si levels were shown for samples containing various percentages of Si at the core indicating the presence of the DPB region for all examined samples at various Si levels in the core.

While not wanting to be bound by the following, it is believed that the presence of high Fe content leads to higher post braze strength. Finally, though higher Fe content may lead to deleterious corrosion behavior, this effect was mitigated by adding Ti, producing Ti rich bands in the post braze condition which improved corrosion behavior.

The alloys described herein display improved post braze strength and air-side corrosion resistance. DPB are present after brazing at a core composition up to 0.4% Si, even if not visible. This was demonstrated during SWAAT airside corrosion testing, where the corrosion pattern observed indicated the presence of the DPB band which acts sacrificially to protect the core material. The core alloys described in this patent application can be made from a wider range of metal inputs and do not contain any intentionally added V, Cr, or Zr. If V, Cr, or Zr is present in the core alloy, it is only present as an impurity from scrap metal input. The sum of impurities in the core alloy is up to 0.15%. Individual impurities such as V, Cr, or Zr may be 0% or below 0.05%, below 0.04%, below 0.03%, or below 0.02%, provided the sum of all impurities is not more than 0.15%.

The present invention further provides multi-layer metal sheets that include the aluminum alloy compositions described above as the core alloy. The multi-layer metal sheet comprises a core layer, as described above, having a first side and a second side, and optionally a first cladding layer and a second cladding layer. In some embodiments, the core layer is clad on only one side. In other embodiments, the core layer is clad on both sides. The first cladding layer and the second cladding layer may be the same chemical composition or different. In another embodiment, the core layer is clad on one side of the core layer and a water sideliner is placed on the other side of the core layer. The first cladding layer and the second cladding layer can each comprise 0%-4% Zn, 1%-4% Zn or 2.5%-4.0% of Zn. In the multi-layer sheet, the first side of the core layer is adjacent to the first cladding layer to form a first interface and the second side of the core layer is adjacent to a second cladding layer to form a second interface.

These multi-layer metal sheets are corrosion resistant and provide a brazing package for use in manufacturing tubing. In some embodiments, the multi-layer metal sheet comprises a core layer of aluminum-containing alloy comprising from 0.1%42% Ti, wherein the core layer has a first side and a second side; a first cladding layer comprising 0%-4% Zn, 1%-4% Zn or 2.5%-4.0% of Zn; and a second cladding layer comprising 0%-4% Zn, 1%-4% Zn or 2.5%-4.0% of Zn. In the multi-layer metal sheet, the first side of the core layer is adjacent to the first cladding layer to form a first interface and the second side of the core layer is adjacent to a second cladding layer to form a second interface.

Optionally, in some embodiments, the core layer is made of an alloy comprising up to 0.25% Si, up to 0.25% Fe, 0.5-0.6% Cu, 1.4-1.6% Mn, 0.06-0.14% Mg, up to 0.05% Cr, up to 0.04% Zn, 0.1-0.2% Ti, up to 0.05% Sr, up to 0.15% of impurities, and the balance aluminum. Optionally, the first cladding layer and the second cladding layer are made of an alloy comprising 6-13% Si, up to 0.4% Fe, up to 0.1% Cu, up to 0.1% Mn, up to 0.15% Mg, up to 0.05% Cr, 2.5-4.0% Zn, up to 0.05% Ti, up to 0.02% Sr, up to 0.15% of impurities, and the balance aluminum. In another embodiment, the first cladding layer and the second cladding layer are made of an alloy comprising 6-13% Si, up to 0.4% Fe, up to 0.1% Cu, up to 0.1% Mn, up to 0.15% Mg, up to 0.05% Cr, 1.0-4.0% Zn, up to 0.05% Ti, up to 0.02% Sr, up to 0.15% of impurities, and the balance aluminum. In another embodiment, the first cladding layer and the second cladding layer are made of an alloy comprising from 6-13% Si, up to 0.4% Fe, up to 0.1% Cu, up to 0.1% Mn, up to 0.15% Mg, up to 0.05% Cr, up to 4.0% Zn, up to 0.05% Ti, up to 0.02% Sr, up to 0.15% of impurities, and the balance aluminum.

The sheet described herein can further comprise a fin. The fin can be a zinc containing fin or an aluminum-containing fin. Optionally, the zinc containing fin can contain zinc in an amount of 1.5% or more. In another embodiment, the zinc containing fin can contain zinc in an amount of 3.0% or more.

The core is cast by any suitable commercial casting process with the direct chill (DC) casting method being preferred. The ingot can be subsequently scalped. In one embodiment of the present invention in which DC casting was employed, the DC cast ingots were thereafter heated to 520° C. in 12 hrs. This step was followed by soak at 520° C. for 5 hrs. for the first ingots and close to 6 hrs. for the last ingots produced. Next the ingots were hot rolled to 19 mm thick gauge. The clad material was then welded to the core. The cladding material was an aluminum-based brazing alloy containing Si as a main alloying element. AA4343 aluminum alloy (nominal or average of 7.2% Si with a minimal amount of about 6.7%) was used as a clad material and roll bonded to the various core alloy compositions being tested. Subsequently, the package was reheated after welding at 450° C. for 45-60 minutes. This was followed by hot rolling the package to 3-4 mm thick gauge. The package was subsequently cold rolled to 1-2 mm thick gauge. Then, it was cold rolled further to the required final gauge thickness (about 300 μm). It should be noted that the target clad thickness was about 7.5% of the total braze sheet thickness, which is about 300 μm. Subsequent partial annealing treatment was applied at 305° C. for 3 hours to ensure that the alloy was in H24 temper condition.

The brazing alloy sheet was subjected to a simulated brazing cycle, by being heated in the furnace, held at 605-610° C. for 3-5 minutes, followed by air cooling. During this process, the dense precipitate band (DPB) was formed in the surface of the core alloy adjacent to the brazing alloy.

The core alloy and the brazing alloy sheet can be used in various applications, for example heat exchangers such as radiators, condensers, evaporators, oil coolers, inter coolers, charge air coolers and heater cores. The core alloy and the brazing alloy sheet is particularly useful for high performance, light weight, automotive heat exchangers but could be used for other brazed applications including but not limited to refrigeration and HVAC. Other objects and advantages of the invention will be apparent from the following detailed description of embodiments of the invention.

DESCRIPTION

Definitions

Figure 1:
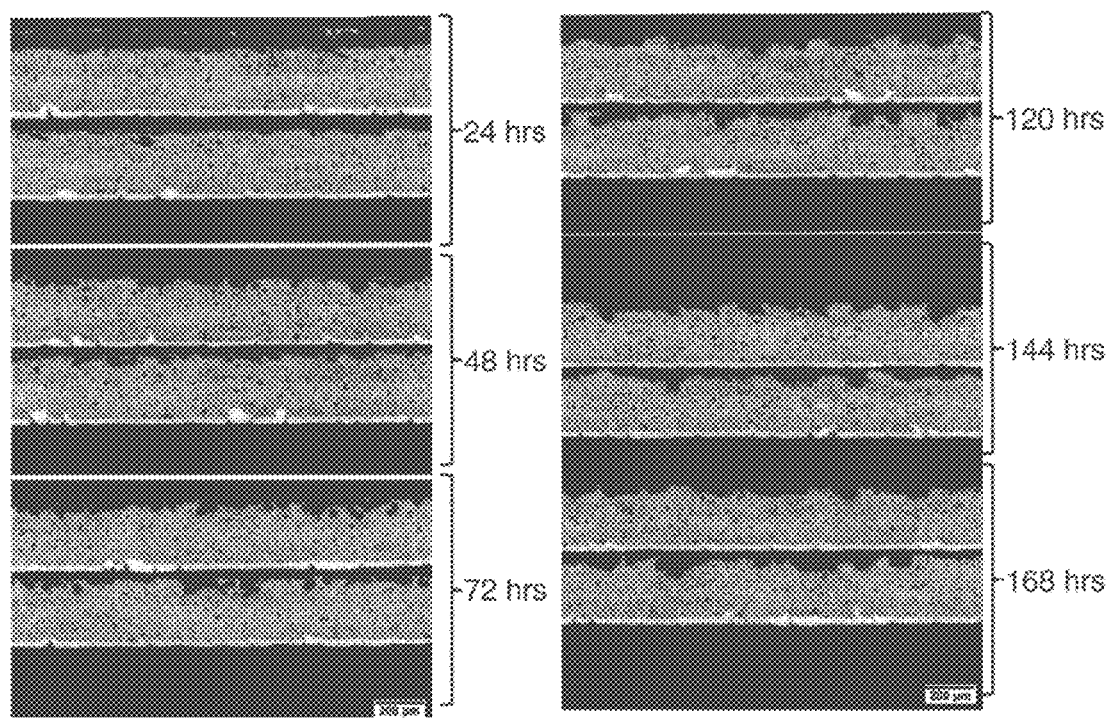
FIG. 1 contains photomicrographs showing Sample AB916 after immersion in a 0.1M HCl solution for 24 hours, 48 hours, 72 hours, 120 hours, 144 hours, and 168 hours.

The term "up to" includes 0%. The term "up to" a particular number includes that number. A hyphen (-) between two numbers in a range for any element indicates, for example 6-13, indicates 6 to 13 and the range includes 6, 13 and any amount between 6 and 13. Elements are indicated in weight percent (wt %) or % of the alloy throughout the application.

The present invention provides new aluminum alloy compositions which display higher strength, corrosion resistance and can accept a higher amount of braze scrap as an input metal compared to previous alloys. This alloy is particularly useful as a core alloy in brazing sheet. By accepting scrap as an input metal, this alloy is more environmentally friendly and cost-effective. This alloy was made by direct chill (DC) casting. The alloy can be used in various applications, for example heat exchangers.

The present invention provides a corrosion resistant brazing sheet package for use in manufacturing tubing. The brazing sheet package includes a core layer of aluminum-containing alloy having a first side and a second side. The first side of the core layer is adjacent to a first cladding layer to form a first interface. The second side of the core layer is adjacent to a second cladding layer to form a second interface. As understood to those of skill in the art, the core layer is usually the term given to the layer whose primary purpose is to influence the bulk mechanical properties of the overall sheet product. The cladding layers refer to the layers that dictate surface characteristics (e.g., corrosion resistance). Some of the alloys described herein are identified using the number designation system as provided in "International Alloy Designations and Chemical Composition Limits for Wrought Aluminum and Wrought Aluminum Alloys," published by The Aluminum Association, revised February 2009, which is hereby incorporated by reference in its entirety.

Core Alloy Composition

The core layer is an aluminum-containing alloy. In some embodiments, alloys designated as "X900 series" alloys are suitable for use as the core layer. Optionally, an alloy suitable for use as the core layer includes an alloy similar in composition to alloy X901, but containing a higher percentage of Ti. Additional Ti can be added to result in a total amount of Ti of from 0.1-0.2% to result in an alloy designated as alloy X912. The elemental composition of alloy X912 is provided in Table 1.

TABLE 1

| Element | Weight Percentage (wt %) |
| --- | --- |
| Si | Up to 0.25 |
| Fe | Up to 0.25 |

TABLE 1-continued

| Element | Weight Percentage (wt %) |
|---|---|
| Cu | 0.5-0.65 |
| Mn | 1.4-1.6 |
| Mg | 0.06-0.14 |
| Cr | Up to 0.05 |
| Zn | Up to 0.04 |
| Ti | 0.1-0.2 |
| Sr | 0.05 |
| Impurities | Up to 0.15 Total |
| Al | Remainder |

In another embodiment, the core alloy comprises up to 0.25% Si, up to 0.25% Fe, 0.5-0.6% Cu, 1.4-1.6% Mn, 0.06-0.14% Mg, up to 0.05% Cr, up to 0.04% Zn, 0.1-0.2% Ti, up to 0.05% Sr, up to 0.15% of impurities, and the balance Al.

In yet another embodiment, the core alloy comprises 0.16-0.25% Si, 0.15-0.55% Fe, 0.5-0.6% Cu, 1.4-1.6% Mn, 0.06-0.14% Mg, up to 0.05% Cr, up to 0.04% Zn, 0.1-0.2% Ti, up to 0.05% Sr, up to 0.15% of impurities, and the balance Al.

In one embodiment, the core alloy comprises 0.03-0.5% Si, 0.5-1.1% Cu, 0.001-0.20% Ti, 0.15-0.55% Fe, 0-0.35% Mg, 1.3-1.80% Mn, up to 0.15% of impurities, remainder Al.

In another embodiment, the core alloy comprises about 0.04-0.4% Si, 0.5-1.0% Cu, 0.005-0.15% Ti, 0.20-0.50% Fe, 0-0.29% Mg, 1.4-1.70% Mn, up to 0.15% of impurities, remainder Al.

In still another embodiment, the core alloy comprises about 0.05-0.34% Si, 0.5-0.95% Cu, 0.01-0.15% Ti, 0.25-0.45% Fe, 0-0.27% Mg, 1.45-1.65% Mn, up to 0.15% of impurities, remainder Al.

In yet another embodiment, the core alloy comprises about 0.05-0.34% Si, 0.5-0.80% Cu, 0.01-0.15% Ti, 0.25-0.45% Fe, 0-0.27% Mg, 1.45-1.65% Mn, up to 0.15% of impurities, remainder Al.

In another embodiment, the core alloy comprises about 0.16-0.5% Si, 0.5-1.1% Cu, 0.001-0.20% Ti, 0.15-0.55% Fe, 0-0.35% Mg, 1.3-1.80% Mn, up to 0.15% of impurities, remainder Al.

In still another embodiment, the core alloy comprises about 0.16-0.4% Si, 0.5-1.0% Cu, 0.005-0.15% Ti, 0.20-0.50% Fe, 0-0.29% Mg, 1.4-1.70% Mn, up to 0.15% of impurities, remainder Al.

In still another embodiment, the core alloy comprises about 0.16-0.4% Si, 0.5-0.95% Cu, 0.005-0.15% Ti, 0.20-0.50% Fe, 0-0.29% Mg, 1.4-1.70% Mn, up to 0.15% of impurities, remainder Al.

In yet another embodiment, the core alloy comprises about 0.16-0.4% Si, 0.5-0.80% Cu, 0.005-0.15% Ti, 0.20-0.50% Fe, 0-0.29% Mg, 1.4-1.70% Mn, up to 0.15% of impurities, remainder Al.

In still another embodiment, the core alloy comprises about 0.16-0.4% Si, 0.5-1.0% Cu, 0.005-0.15% Ti, 0.20-0.40% Fe, 0-0.29% Mg, 1.4-1.70% Mn, up to 0.15% of impurities, remainder Al.

In another embodiment, the core alloy comprises about 0.16-0.34% Si, 0.5-0.95% Cu, 0.01-0.15% Ti, 0.25-0.45% Fe, 0-0.27% Mg, 1.45-1.65% Mn, up to 0.15% of impurities, remainder Al.

In yet another embodiment, the core alloy comprises about 0.2-0.5% Si, 0.52-0.80% Cu, 0.11-0.20% Ti, 0.25-0.55% Fe, 0-0.2% Mg, 1.51-1.80% Mn, up to 0.15% of impurities, remainder Al.

In still another embodiment, the core alloy comprises about 0.2-0.5% Si, 0.52-0.75% Cu, 0.11-0.20% Ti, 0.25-0.55% Fe, 0-0.2% Mg, 1.51-1.80% Mn, up to 0.15% of impurities, remainder Al.

In yet another embodiment, the core alloy comprises about 0.2-0.4% Si, 0.52-0.7% Cu, 0.11-0.18% Ti, 0.25-0.55% Fe, 0-0.2% Mg, 1.51-1.75% Mn, up to 0.15% of impurities, remainder Al.

In another embodiment, the core alloy comprises up to 0.25% Si, 0.15-0.55% Fe, 0.5-0.6% Cu, 1.4-1.6% Mn, 0.06-0.14% Mg, up to 0.05% Cr, up to 0.04% Zn, 0.1-0.2% of Ti, up to 0.05% of Sr, up to 0.15% of impurities, and the balance Al.

In yet another embodiment, the core alloy comprises 0.16-0.25% Si, 0.15-0.55% Fe, 0.5-0.6% Cu, 1.4-1.6% Mn, 0.06-0.3% Mg, up to 0.05% Cr, up to 0.04% Zn, 0.1-0.2% of Ti, up to 0.05% Sr, up to 0.15% of impurities, and the balance Al.

In still another embodiment, the core alloy comprises 0.16-0.25% Si, 0.15-0.55% Fe, 0.5-0.6% Cu, 1.4-1.6% Mn, 0.0-0.3% Mg, up to 0.05% Cr, up to 0.04% Zn, 0.1-0.2% Ti, up to 0.05% Sr, up to 0.15% of impurities, and the balance Al.

In another embodiment, the alloy comprises about 0.2-0.5% Si, 0.52-0.80% Cu, 0.11-0.20% Ti, 0.25-0.55% Fe, 0-0.2% Mg, 1.51-1.80% Mn, up to 0.15% of impurities, remainder Al.

In some embodiments, the core layer includes up to 0.25% silicon (Si). For example, the core layer can include 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, or 0.25% Si. In some embodiments, the core layer can also include up to 0.25% iron (Fe). In some embodiments, the core layer can include 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, or 0.25% Fe. In some embodiments, the core layer can further include copper (Cu) in an amount of from 0.5%-0.65%. For example, the core layer can include 0.5%, 0.51%, 0.52%, 0.53%, 0.54%, 0.55%, 0.56%, 0.57%, 0.58%, 0.59%, 0.6%, 0.61%, 0.62%, 0.63%, 0.64%, or 0.65% Cu.

In some embodiments, the core layer can further include manganese (Mn) in an amount of from 1.4% to 1.6% (e.g., 1.4%, 1.5%, or 1.6%). In some embodiments, magnesium (Mg) can be included in the core layer in an amount of from 0.06% to 0.14%. For example, Mg can be included in the core layer in an amount of from 0.06%, 0.07%, 0.08%, 0.09%, 0.1%, 0.11%, 0.12%, 0.13%, or 0.14%. In other embodiments, Mg can be included in the core layer in an amount of from 0.0% to 0.35%. In some embodiments, Mg can be included in the core layer in an amount of from 0.0% to 0.05%. For example, Mg can be included in the core layer in an amount of 0.0%, 0.01%, 0.015%, 0.02%, 0.025%, 0.03%, 0.035%, 0.04%, 0.045%, or 0.05%. In some embodiments, titanium (Ti) can be included in the core layer in an amount of from 0.1% to 0.2% (e.g., 0.1%, 0.11%, 0.12%, 0.13%, 0.14%, 0.15%, 0.16%, 0.17%, 0.18%, 0.19%, or 0.2%). The presence of Ti in the core layer, among other components, results in a core layer with corrosion resistance properties. Optionally, the core layer can further include up to 0.05% each of chromium (Cr) and/or strontium (Sr). For example, the core layer can include 0.01%, 0.02%, 0.03%, 0.04%, or 0.05% of Cr. The core layer can include 0.001%, 0.005%, 0.01%, 0.02%, 0.03%, 0.04%, or 0.05% of Sr. Optionally, the core layer can include up to 0.2% of Zinc (Zn). For example, the core layer can include up to 0.2%, up to 0.1%, and up to 0.04% of Zn. In some embodiments, the core layer includes trace amounts of one or more of Cr, Zn, and Sr. As used herein, trace amounts means that the element is present in an amount of less than 0.001% (e.g., less than 0.005%, less than 0.0005%, or less than 0.0001%).

The total amount of impurities present in the core layer can be up to 0.15%. Optionally, each impurity can be present in an amount of up to 0.05% of the core layer. The remaining percentage of the core layer is aluminum.

It is to be understood that the core alloy compositions described above may contain other minor elements sometimes referred to as impurities in scrap metal input, below 0.05%, below 0.04%, below 0.03%, below 0.02% or below 0.01%. These impurities in scrap metal may include but are not limited to V, Zr and Cr or combinations thereof. Accordingly, V, Zr or Cr may be present in core alloys in amounts of 0.05%, below 0.05%, below 0.04%, below 0.03%, below 0.02% or below 0.01%. In general the impurity levels are below 0.05% for Cr and below 0.01% for Zr. When impurities are present, for example from scrap metal as an input metal, they are present in a maximum of 0.05% each, provided the sum of all impurities does not exceed 0.15%.

The thickness of the core layer can be from 100 microns to 4000 microns. For example, the core layer can be from 150 microns to 3500 microns, from 200 microns to 3000 microns, from 250 microns to 2500 microns, from 300 microns to 2000 microns, from 350 microns to 1500 microns, from 400 microns to 1000 microns, from 450 microns to 900 microns, from 500 microns to 800 microns, or from 550 microns to 700 microns.

The alloys described above for use as the core layer are resistant to corrosion and have good mechanical properties. The alloys are formulated to produce a sacrificial band of dense precipitates at the first and second interfaces (i.e., between the core alloy and the first and second cladding layers). As used herein, sacrificial means that the dense precipitate band region will corrode in preference to the core layer. The dense precipitate band region can form during the braze cycle. This band prevents perforation of the tubes from the outside and enhances the corrosion resistance of the core layer, as described in U.S. Pat. No. 5,041,343, U.S. Pat. No. 5,037,707, U.S. Pat. No. 6,019,939 and International Patent Publication No. WO 94/22633, which are incorporated by reference herein in their entireties. The band of dense precipitate typically has a thickness of about 20-50 µm (e.g., about 25-40 µm).

Cladding Layers

The present invention further provides multi-layer metal sheets that include the aluminum alloy compositions described above as the core alloy. The multi-layer metal sheet comprises a core layer, as described above, having a first side and a second side, and optionally a first cladding layer and a second cladding layer. In some embodiments, the core layer is clad on only one side. In other embodiments, the core layer is clad on both sides. The first cladding layer and the second cladding layer may be the same chemical composition or different. In another embodiment, the core layer is clad on one side of the core layer and a water sideliner is placed on the other side of the core layer. In some embodiments, the first cladding layer and the second cladding layer can each comprise 0%-4% Zn, 1%-4% Zn or 2.5%-4.0% of Zn. In the multi-layer sheet, the first side of the core layer is adjacent to the first cladding layer to form a first interface and the second side of the core layer is adjacent to a second cladding layer to form a second interface.

These multi-layer metal sheets are corrosion resistant and provide a brazing package for use in manufacturing tubing. In some embodiments, the multi-layer metal sheet comprises a core layer of aluminum-containing alloy comprising from 0.1%-0.2% Ti, wherein the core layer has a first side and a second side; a first cladding layer comprising 0%-4% Zn, 1%-4% Zn or 2.5%-4.0% of Zn; and a second cladding layer comprising 0%-4% Zn, 1%-4% Zn or 2.5%-4.0% of Zn. In the multi-layer metal sheet, the first side of the core layer is adjacent to the first cladding layer to form a first interface and the second side of the core layer is adjacent to a second cladding layer to form a second interface.

As described above, in some embodiments the brazing sheet package further includes a first cladding layer and a second cladding layer. The first cladding layer is adjacent to and contacts the first side of the core layer to form a first interface (i.e., no layers intervene between the first cladding layer and the first side of the core layer). The second cladding layer is adjacent to and contacts the second side of the core layer to form a second interface (i.e., no layers intervene between the second cladding layer and the second side of the core layer). The first and second cladding layers contain zinc. In some embodiments, the first and second cladding layers are "AA4000 series" alloys. Optionally, the alloys suitable for use as the first and second cladding layers include an alloy similar in composition to alloy AA4343, but containing a higher percentage of Zn. Additional Zn can be added to result in a total amount of Zn from about 2.1% to about 3.8%, from about 2.5% to about 3.5%, from about 2.7% to about 3.3%, based on each of the first and second cladding layers. The elemental composition of such a modified alloy AA4000 can include 6-13% Si, up to 0.7% Fe, up to 0.1% Cu, up to 0.1% Mn, up to 0.15% Mg, up to 0.05% Cr, up to 4% Zn or 2.5-4.0% Zn, up to 0.05% Ti, 0 to 0.02% Sr, up to 0.15% total impurities, and the remainder Al.

Optionally, in some embodiments the alloys suitable for use as the first and second cladding layers include an alloy similar in composition to alloy X403, but containing a higher percentage of Zn. Additional Zn can be added to result in a total amount of Zn of from 2.7% to 3.3%, based on each of the first and second cladding layers, to result in an alloy designated as alloy X477.

In some embodiments, the first and second cladding layers include from 6.0-13.0% of Si (e.g., from 7.0-8.0% Si). For example, the first and second cladding layers can include 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, or 13.0% Si. In some embodiments, the first and second cladding layers can also include up to 0.4% of Fe. In some embodiments, the first and second cladding layers can include 0.1%, 0.15%, 0.2%, 0.25%, 0.3%, 0.35%, or 0.4% Fe. In some embodiments, the first and second cladding layers can further include Cu and/or Mn in amounts of up to 0.1%. In some embodiments, the first and second cladding layers can include trace amounts of one or more of Cu and Mn.

Optionally, in some embodiments, the first and second cladding layers can further include up to 0.20% of Mg. For example, the first and second cladding layers can include 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, or 0.20% of Mg. Optionally, the first and second cladding layers can further include up to 0.05% each of Cr and Ti. The first and second cladding layers can include 0.01%, 0.02%, 0.03%, 0.04%, or 0.05% of Cr. The first and second cladding layers can include 0.01%, 0.02%, 0.03%, 0.04%, or 0.05% of Ti. In some embodiments, the first and second cladding layers can include trace amounts of one or more of Mg, Cr, and Ti.

In some embodiments, the first and second cladding layers can further include from 2.5% to 4.0% of Zn. For example, the first and second cladding layers can include 2.5%, 2.6%, 2.7%, 2.8%, 2.9%, 3%, 3.1%, 3.2%, 3.3%, 3.4%, 3.5%, 3.6%, 3.7%, 3.8%, 3.9%, or 4% of Zn. Zn can diffuse into the core layer during the brazing cycle, which generates a Zn diffusion layer within the core that results in a corrosion resistant material. In some embodiments, the first and second cladding layers can also include Sr in an amount of up to 0.02% (i.e., from 0% to 0.02%). For example, Sr can be included in the first and second cladding layers in amount of 0.001%, 0.002%, 0.003%, 0.004 wt %, 0.005%, 0.006%, 0.007%, 0.008%, 0.009%, 0.01%, 0.011%, 0.012%, 0.013%, 0.014%, 0.015%, 0.016%, 0.017%, 0.018%, 0.019%, or 0.02%.

The total amount of impurities present in the first and second cladding layers can be up to 0.15%. Optionally, each impurity can be present in an amount of up to 0.05% of the first and second cladding layers. The remaining percentage of the first and second cladding layers is aluminum.

In some embodiments, the first cladding layer and the second cladding layer are identical in composition. In other embodiments, the first cladding layer and the second cladding layer differ in composition.

The thickness of each of the first cladding layer and the second cladding layer can be up to 18% of the thickness of the core layer. For example, the first and second cladding layers can be 17.5%, 17%, 16.5%, 16%, 15.5%, 15%, 14.5%, 14%, 13.5%, 13%, 12.5%, 12%, 11.5%, 11%, 10.5%, 10%, 9.5%, 9%, 8.5%, 8%, 7.5%, 7%, 6.5%, or 6% of the thickness of the core layer.

Brazing Sheet Package

A clad metal sheet can be made from the core layer, first cladding layer, and second cladding layer using any conventional method known to those of skill in the art. For example, the clad sheet can be made by hot metal rolling or the like to bond the cladding and the core. Optionally, the clad sheet can be made by hot and cold rolling a composite cast ingot as described in U.S. Published Patent Application No. 2005/0011630, which is hereby incorporated by reference in its entirety. The resulting clad sheet provides good resistance to corrosion.

The clad sheet, once formed, can be converted to tube form by any method of tube formation known to those of skill in the art. For example, the clad sheet can be converted to tube form by folding or welding. The resulting tubes can be used, for example, in a heat exchanger.

Optionally, a fin can be attached to the sheet or tube. In some embodiments, the fin can be a zinc containing fin. Suitable fins for use in the packages described herein include 3913, X373 alloy or 31420, X334 alloy with zinc added. The zinc content in the fin can be equal to or higher than the zinc content at the surface of the clad sheet in tube form after the brazing cycle. For example, the fin can contain zinc in an amount of 1.5% or more (e.g., 1.6% or more, 1.7% or more, 1.8% or more, 1.9% or more, 2% or more, 2.1% or more, 2.2% or more, 2.3% or more, 2.4% or more, or 2.5% or more). The fin can protect the core if the zinc diffusion zone in the tube depletes. In some embodiments, the fin can be a bare Al alloy.

Method of Making the Alloy Composition and Brazing Sheet Package

The compositions of the core alloys used in the following experimental sections are presented in Table 2, with the remainder as aluminum. The following fabrication procedure was used. The core alloy compositions in Table 2 were made with a Direct Chill (DC) process, which is commonly used throughout the aluminum sheet industry, whereby a small DC ingot about 76 mm×152 mm×229 mm was cast. The small DC ingot was scalped by about 6.5 mm from each side. The machined ingots were thereafter heated to 520° C. in 12 hrs. This step was followed by soak at 520° C. for 5 hrs. for the first ingots and close to 6 hrs. for the last ingots produced. Next the ingots were hot rolled to 19 mm thick gauge. This was clad on one side with a 4 mm thick plate of AA4343 brazing alloy. This composition was heated to 450° C. for 45-60 minutes. This was followed by hot rolling the package to 3-4 mm thick gauge. The package was subsequently cold rolled to 1-2 mm thick gauge. Then, it was cold rolled further to the required final gauge thickness (about 300 μm). It should be noted that the target clad thickness was about 7.5% of the total braze sheet thickness, which is about 300 μm. The partial anneal involved a temperature ramp of 30° C. per hour followed by 3 hour soak at 305° C. to ensure that the alloy was in H24 temper condition.

The brazing alloy sheet was subjected to a simulated brazing cycle, by being heated in a furnace, held at 605-610° C. for 3 minutes, and followed by air cooling. During this process, the dense precipitation band, also known as brown band, is formed in the surface of the core alloy adjacent to the brazing alloy. The dense precipitation band develops fully during brazing. The comparative alloy H is an alloy cast to be within the composition range, as disclosed in U.S. Pat. No. 6,019,939.

TABLE 2

| Alloy # | Mn | Cu | Mg | Si | Fe | Ti |
| --- | --- | --- | --- | --- | --- | --- |
| Comparative (H) | 1.49 | 0.55 | 0.10 | 0.06 | 0.18 | 0.011 |
| 2 (I) | 1.50 | 0.55 | 0.10 | 0.24 | 0.19 | 0.010 |
| 3 (J) | 1.48 | 0.56 | 0.09 | 0.32 | 0.20 | 0.011 |
| 4 (K) | 1.51 | 0.57 | 0.09 | 0.40 | 0.21 | 0.011 |
| 5 (L) | 1.48 | 0.58 | 0.10 | 0.06 | 0.34 | 0.011 |
| 6 (M) | 1.50 | 0.58 | 0.10 | 0.06 | 0.47 | 0.011 |
| 7 (P) | 1.50 | 0.59 | 0.10 | 0.06 | 0.18 | 0.14 |
| 9 (R) | 1.50 | 0.58 | 0.10 | 0.24 | 0.18 | 0.14 |
| 10 (S) | 1.52 | 0.58 | 0.10 | 0.25 | 0.35 | 0.14 |
| 11 (T) | 1.54 | 0.58 | 0.10 | 0.24 | 0.46 | 0.15 |
| 12 (U) | 1.51 | 0.57 | 0.10 | 0.31 | 0.35 | 0.16 |
| 13 (V) | 1.52 | 0.58 | 0.10 | 0.31 | 0.49 | 0.16 |
| 14 (W) | 1.55 | 0.57 | 0.09 | 0.38 | 0.32 | 0.17 |

(all in wt %)

Properties of the Alloy Composition

In order to determine the mechanical and corrosion behavior of the material as well as examine the metallurgical changes, the following tests were applied. The samples were manufactured as per ASTM B557 standards. Three samples were tested from each alloy variant and the average values were reported in both pre-braze and post-braze conditions. In order to acquire consistent results, the samples were manufactured to edge roughness of 0.5 Ra. Microstructure characterization was carried out to investigate dispersoids and intermetallics sizes and distribution, as well as the pre and post braze grain structure. The microstructure was examined by etching the samples in 2.5% $HBF_4$ for 60 seconds followed by de-smutting in $HNO_3$. Barker's etch was used to reveal the grain structure.

The open circuit potential corrosion values were measured using ASTM G69 standards. The difference in corrosion potential between the dense precipitate band (DPB) and the core was measured (DPB measurements was carried out by grinding and polishing to ensure that the exposed surface is within the DPB area).

Air side corrosion (SWAAT) was carried out according to ASTM G85 Annex 3. Synthetic sea water acidified to 2.8-3.0 pH (42 g/l synthetic sea salt+10 ml/l glacial acetic acid) was used. The samples were subsequently cleaned in 50% nitric acid for 1 hr., sectioned at 4 different locations and examined to detect corrosion. A qualitative scale was used to assess the severity of corrosion after the samples were subject to SWAAT testing, where the corrosion was characterized as: ok, moderate, moderate/severe, severe and very severe. The corrosion severity was characterized as: (i) ok: for corrosion occurrence within the DPB region; (ii) moderate: for corrosion occurrence that just consumed the DPB region; (iii) moderate/severe: for corrosion occurrence that consumed up to one quarter to one third of the core thickness, (iv) severe: for corrosion occurrence which consumed more than half the core thickness without perforation and (v) very severe for corrosion occurrence which lead to perforation.

Twelve new DC alloy compositions were made (alloys numbered as 2-7 and 9-14, see Table 2) in addition to the comparative alloy H. The composition range of these new alloys was within the following ranges: 0-0.5% Si, 0.2-0.5% Fe, 0.5-1.1% Cu, 1.4-1.6% Mn, 0-0.35% Mg, 0.01-0.17% Ti and with the remainder aluminum. These alloys had a minimum yield tensile strength of about 170 MPa after partial anneal treatment. The minimum post braze yield strength of about 63 MPa and ultimate tensile strength of about 172 MPa for the comparative alloy (H) were obtained. The alloys in Table 4 generally showed a higher post braze yield strength and ultimate tensile strength than the comparative alloy (H). For example, alloy W (#14) showed a post braze yield strength of about 72 MPa and ultimate tensile strength of about 187 MPa (Table 4).

The open circuit potential corrosion value (vs. Standard Calomel Electrode (SCE)) of -671 mV for the comparative alloy H to -659 mV for alloy R was recorded. As the DPB should act sacrificially to protect the core, higher corrosion potential differences between both indicate effective protection, while a reduction in the corrosion potential indicates that the DPB will not act as an effective sacrificial layer to protect the core material. The difference in corrosion potential between the DPB and core (vs. Standard Calomel Electrode (SCE)) was between 30 to 40 mV which was within the required specification for these alloys. Air side (SWAAT) corrosion testing was applied where the materials were able to withstand 28 days in a SWAAT cabinet without failure in post braze condition for the newly developed alloy ranges, especially alloys I, J, K, L, P, T and U, in contrast to failure in less than 21 days for the comparative alloy H. These findings were reported after applying a simulated brazing cycle whereby the sample was heated to a temperature of 605° C. followed by furnace cooling until about 570° C. and subsequent air cooling to room temperature to simulate the temperature time profile of a commercial brazing process. The alloy material produced varied in gauge between 290-310 μm.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Example 1

The post-braze specimens were subjected to SWAAT (ASTM G85) corrosion testing for an exposure of 4 weeks and were examined to characterize the corrosion behavior after 2, 3 and 4 weeks. The corrosion severity was characterized as: (i) ok: for corrosion occurrence within the DPB region; (ii) moderate: for corrosion occurrence that just consumed the DPB region; (iii) moderate/severe: for corrosion occurrence that consumed up to one quarter to one third of the core thickness, (iv) severe: for corrosion occurrence which consumed more than half the core thickness without perforation and (v) very severe for the corrosion occurrence which lead to perforation. The results are presented in Table 3. The alloy compositions tested are shown in Table 2.

TABLE 3

| Alloy # | SWAAT severity of attack (2 weeks) | SWAAT severity of attack (3 weeks) | SWAAT severity of attack (4 weeks) |
|---|---|---|---|
| Comparative (H) | ok | severe | severe |
| 2 (I) | ok | ok | severe |
| 3 (J) | moderate | moderate | moderate/severe |
| 4 (K) | moderate | moderate | moderate |
| 5 (L) | ok | moderate | moderate |
| 6 (M) | severe | severe | severe |
| 7 (P) | ok | ok | ok |
| 9 (R) | ok | ok | severe |
| 10 (S) | moderate | severe | very severe |
| 11 (T) | moderate | severe | severe |
| 12 (U) | moderate/severe | moderate/severe | moderate/severe |
| 13 (V) | severe | severe | very severe |
| 14 (W) | moderate/severe | severe | very severe |

It can be concluded from this table that the post braze specimens based on alloys J (#3) and K (#4), at a Si content of 0.31 and 0.40%, respectively, had better corrosion resistance than that based on the comparative alloy H. Similarly alloy U (#12) that contained a higher percentage of Si (0.31%) and Fe (0.35%), in the presence of high Ti (0.16%). which is a more environmentally friendly alloy that is able to tolerate a wider range of scrap material input, had better corrosion resistance with respect to the comparative alloy H. The corrosion data in Table 3, show that certain alloys with higher Fe content display reduced air side corrosion performance. Based on these data, an upper limit of Fe less than or equal to 0.55% is preferred in some embodiments.

Example 2

Brazed sheet samples were subjected to mechanical testing and the results are presented in Table 4. The results obtained using the comparative core alloy H are included for comparison. The alloy compositions tested are presented in Table 2.

TABLE 4

| Alloy # | Proof Strength (MPa) | UTS (MPa) | Elongation (%) |
|---|---|---|---|
| Comparative (H) | 63 | 173 | 15 |
| 2 (I) | 67 | 179 | 15 |
| 3 (J) | 71 | 179 | 12 |
| 4 (K) | 71 | 181 | 12 |
| 5 (L) | 70 | 181 | 12 |

TABLE 4-continued

| Alloy # | Proof Strength (MPa) | UTS (MPa) | Elongation (%) |
|---|---|---|---|
| 6 (M) | 66 | 182 | 10 |
| 7 (P) | 65 | 172 | 16 |
| 9 (R) | 66 | 176 | 15 |
| 10 (S) | 69 | 184 | 14 |
| 11 (T) | 68 | 182 | 15 |
| 12 (U) | 67 | 182 | 15 |
| 13 (V) | 69 | 183 | 16 |
| 14 (W) | 72 | 187 | 14 |

From these results, the proof strengths of the all the developed alloys are better than the comparative alloy (H). Similarly the ultimate tensile strength (UTS) properties of all the developed alloys, except #7, are better than the comparative alloy (H).

Example 3

Figure 14:
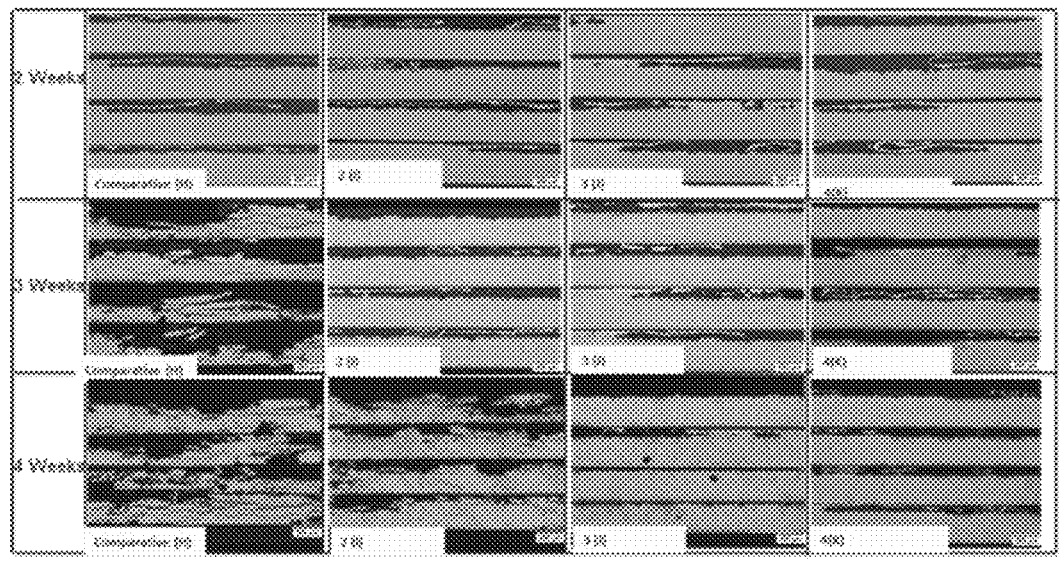
FIG. 14 is a schematic representation of the results of metallographic examinations of SWAAT tested samples for alloys 2, 3 and 4 as well as the comparative alloy (H) presented in Table 2.

In order to examine the effect of variation of Si content on the core, the dense precipitate band formation, and corrosion resistance of the developed alloy, metallographic examinations of the SWAAT tested samples were carried out for alloys 2, 3 and 4, which contain higher % Si as well as the comparative alloy. The results are summarized in FIG. 14. The alloy compositions tested (2, 3, 4, and H) are presented in Table 2. FIG. 14 shows that increasing the Si content leads to improved corrosion performance where most of the corrosion occurred in the DPB band at 0.32 and 0.40% Si. This suggests that increasing the Si content would result in a more effective DPB and improved airside corrosion. Although the DPB may not be visible at higher % Si content after etching, the corrosion pattern observed indicates its presence and effectiveness in improved air side corrosion performance.

Example 4

Clad metal sheets were prepared on a laboratory-scale, processed to final gauge, and exposed to a simulated brazing cycle. For the brazing cycle, the sheets were heated in a furnace at a rate of 25° C. per minute until a temperature of 520° C. was reached. The sheets were then heated at a rate of 13° C. per minute until a temperature of 605° C. was reached, followed by a 3 minute heat soak at 605° C. The sheets were then cooled to 570° C. in 6 minutes, and removed from the furnace to cool at room temperature. The samples were then exposed to an acid immersion test to assess their resistance to corrosion.

Preparation of Samples

The brazing sheet packages were prepared by hot rolling the components to bond the cladding and the core. The slabs were then hot and cold rolled to gauge. The cold rolled material was then slit to size and then partially annealed under nitrogen.

The samples were prepared as brazed coupons of size 3.8×7.5 cm. As shown in Table 5, alloy X900 was used as the core for Sample AB996 and alloy X912 was used as the core for Sample AB916 and Sample A. Alloy X912 contains 0.15% Ti and alloy X900 contains less than 0.1% Ti. AA4343 was used as the cladding for Sample AB916 and Sample AB996. X477 was used as the cladding for Sample A. Alloy X477 contains 3% Zn and alloy AA4343 contains 0.2% Zn. The elemental compositions for alloys X900, X912, AA4343, and X477 are shown in Table 6.

TABLE 5

| Sample | Core | Cladding | Gauge (μm) |
|---|---|---|---|
| AB916 | X912 | 2-sided; 10% AA4343 | 260 |
| AB996 | X900 | 1-sided; 6% AA4343 | 260 |
| A | X912 | 2-sided; 8.5% X477 | 320 |
| B | X912 | 2-sided; 10% X477 | 320 |

TABLE 6

| | Core | | Cladding | |
|---|---|---|---|---|
| Element | X900 (%) | X912 (%) | AA4343 (%) | X477 (%) |
| Si | Up to 0.15 | 0.08 | 6.8-8.2 | 7.35 |
| Fe | Up to 0.25 | 0.20 | 0.8 | 0.20 |
| Cu | 0.5-0.65 | 0.57 | 0.25 | Trace |
| Mn | 1.4-1.6 | 1.50 | 0.10 | Trace |
| Mg | 0.13-0.25 | 0.10 | Trace | Trace |
| Cr | Up to 0.05 | Trace | Trace | Trace |
| Zn | Up to 0.04 | Trace | 0.20 | 3.0 |
| Ti | Up to 0.1 | 0.14 | Trace | Trace |
| Sr | 0.05 | Trace | 0.008-0.02 | 0.014 |
| Impurities | Up to 0.15 Total | 0.15 Total | 0.15 Total | 0.15 Total |
| Al | Remainder | Remainder | Remainder | Remainder |

Acid Immersion Testing

Figure 2:
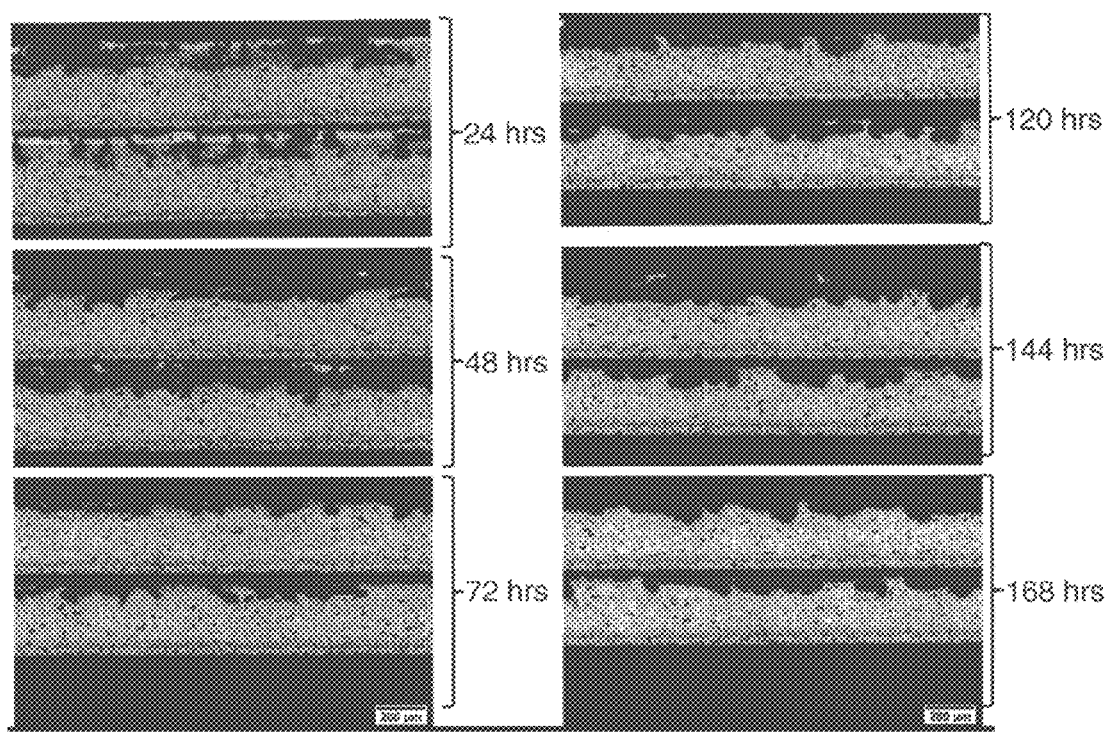
FIG. 2 contains photomicrographs showing Sample AB996 after immersion in a 0.1M HCl solution for 24 hours, 48 hours, 72 hours, 120 hours, 144 hours, and 168 hours.
Figure 3:
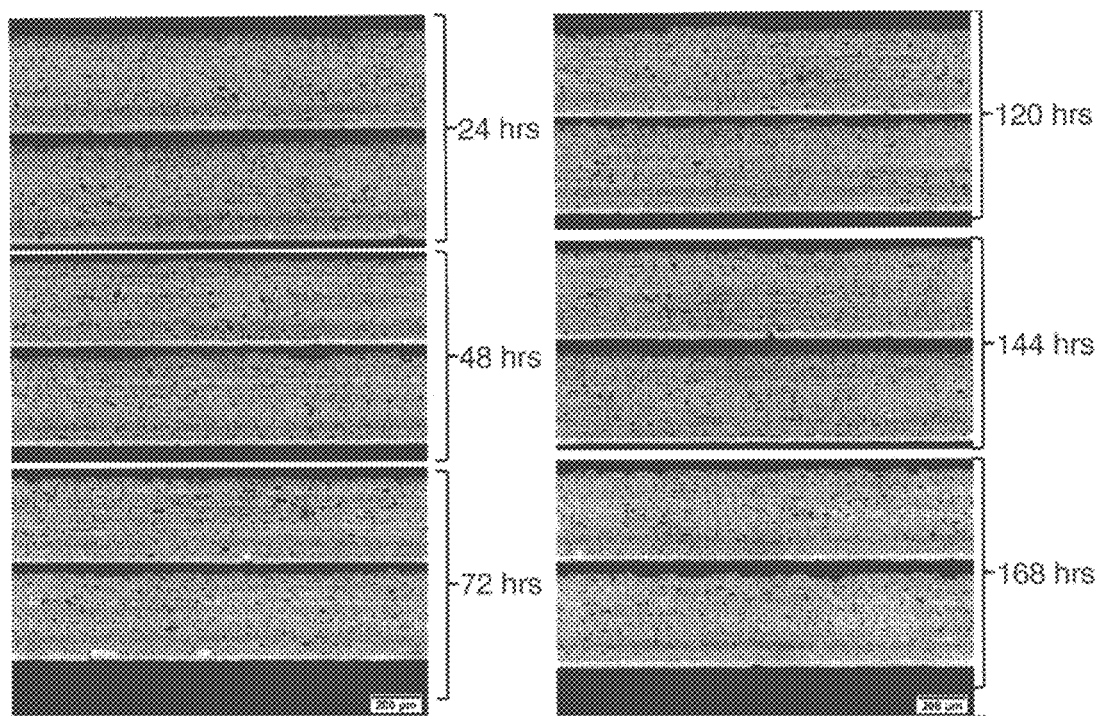
FIG. 3 contains photomicrographs showing Sample A after immersion in a 0.1M HCl solution for 24 hours, 48 hours, 72 hours, 120 hours, 144 hours, and 168 hours.
Figure 4:
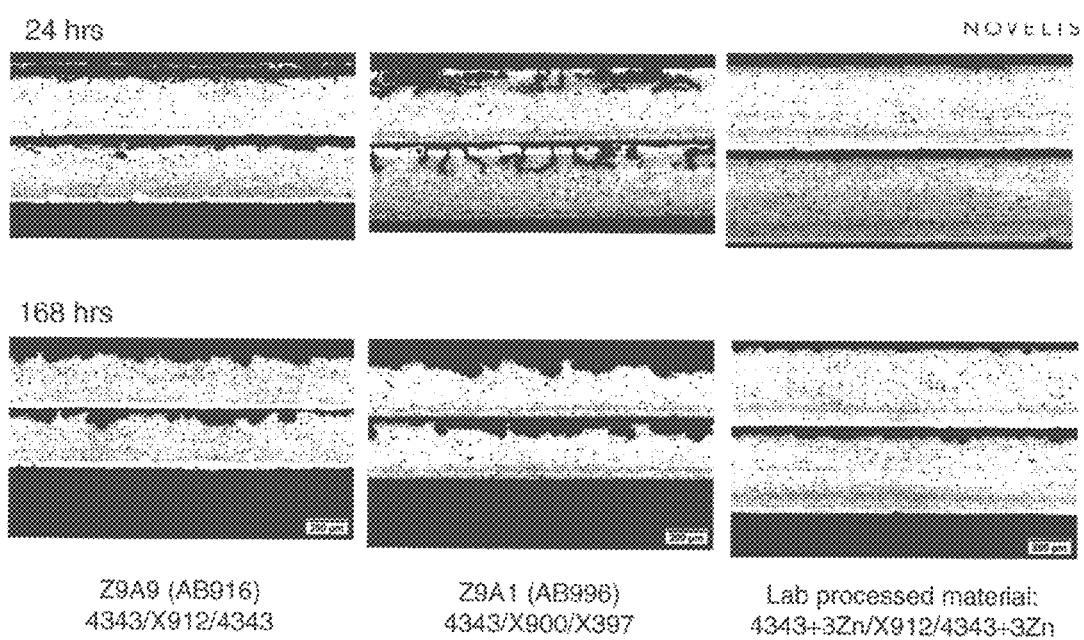
FIG. 4 contains photomicrographs showing the results of Sample AB916, Sample AB996, and Sample A (left, middle and right panes, respectively) after immersion in a 0.1M HCl solution for 24 hours and 168 hours.

The coupons were immersed in a 0.1M HCl (pH=1) solution at room temperature for a time period of 168 hours. The levels of corrosion at time points of 24 hours, 48 hours, 72 hours, 120 hours, 144 hours, and 168 hours were assessed using metallographic examination (see FIG. 1 for Sample AB916, FIG. 2 for Sample AB996, FIG. 3 for Sample A, and FIG. 4 for a comparison of the three samples). As shown in the results, Sample A exhibited the least amount of corrosion of the three packages tested. Not to be bound by theory, the addition of 3% Zn to the AA4343 cladding to provide the X477 cladding suppressed intergranular corrosion through the alpha aluminum and into the dense precipitate band. The mode of attack was changed from localized to general. Also, the Zn addition helped to slow the rate of corrosion.

Example 5

Five core alloy variants from the X900 series were prepared containing the following elemental compositions, with the balance being aluminum:

TABLE 7

| Cast # | Si | Fe | Mn | Ti | Cu | Mg |
|---|---|---|---|---|---|---|
| PDT | 0.07 | 0.15 | 1.50 | 0.014 | 0.58 | 0.001 |
| PDU | 0.07 | 0.15 | 1.51 | 0.15 | 0.58 | 0.001 |
| PDV | 0.24 | 0.15 | 1.50 | 0.15 | 0.58 | 0.001 |
| PDW | 0.24 | 0.15 | 1.50 | 0.20 | 0.58 | 0.001 |
| PDX | 0.25 | 0.15 | 1.49 | 0.20 | 0.58 | 0.10 |

Figure 5:
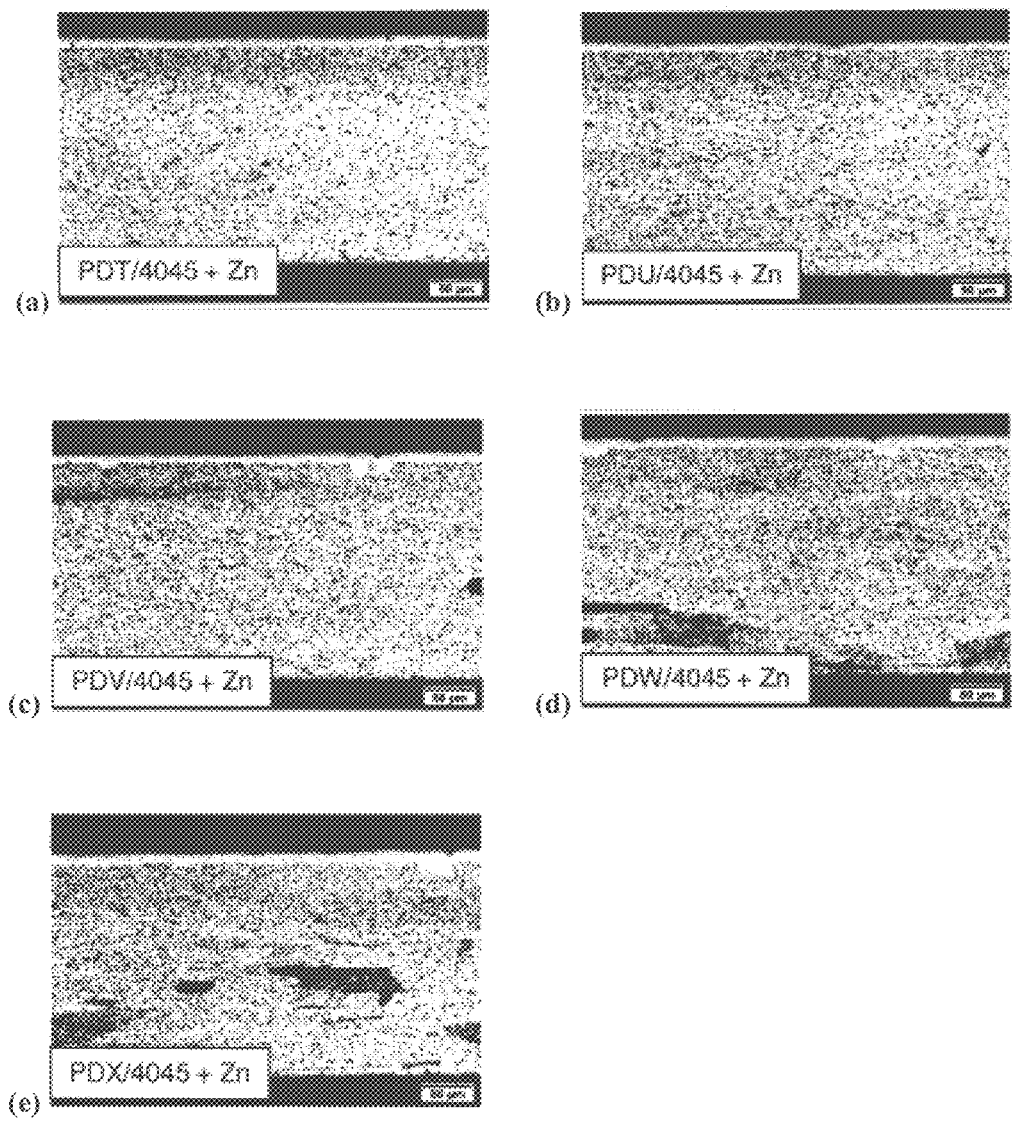
FIG. 5 contains optical microscopy images of the packages containing the AA4045+1% Zn cladding. Panel (a) shows the PDT/AA4045+1% Zn package. Panel (b) shows the PDU/AA4045+1% Zn package. Panel (c) shows the PDV/AA4045+1% Zn package. Panel (d) shows the PDW/AA4045+1% Zn package. Panel (e) shows the PDX/AA4045+1% Zn package.
Figure 6:
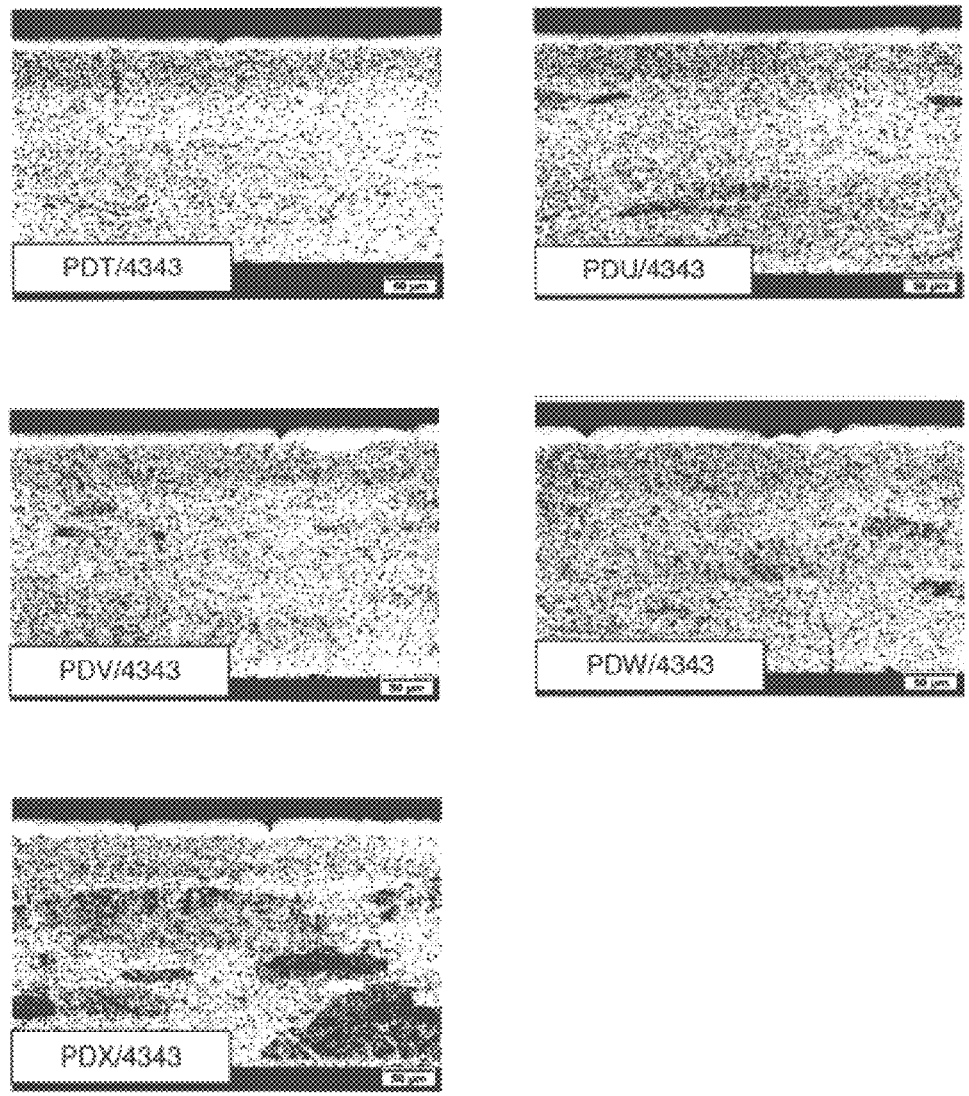
FIG. 6 contains optical microscopy images of the packages containing the AA4343 cladding. Panel (a) shows the PDT/AA4343 package. Panel (b) shows the PDU/AA4343 package. Panel (c) shows the PDV/AA4343 package. Panel (d) shows the PDW/AA4343 package. Panel (e) shows the PDX/AA4343 package.

Each core alloy was bonded to an AA4343 clad and also to an AA4045 clad containing 1% of zinc to provide 10 total packages. The packages were lab-processed to approximately 300 μm. Optical microscopy images of the packages, showing the general microstructure and the dense precipitate band, are provided in FIGS. 5 and 6. The gauge and clad thickness measurements for each of the 10 packages are shown below in Table 8.

TABLE 8

| Cast # | Cladding | Mean total gauge (μm) | Mean clad thickness (μm) | Mean % clad thickness |
|---|---|---|---|---|
| PDT | AA4045 + 1% | 288.4 | 29 | 10.1 |
| PDU | Zn | 282.1 | 30 | 10.6 |
| PDV |  | 288.6 | 30 | 10.4 |
| PDW |  | 288.2 | 29 | 10.1 |
| PDX |  | 278.8 | 27 | 9.7 |
| PDT | AA4343 | 269.7 | 26 | 9.6 |
| PDU |  | 284.9 | 30 | 10.5 |
| PDV |  | 292.9 | 31 | 10.6 |
| PDW |  | 291.4 | 30 | 10.3 |
| PDX |  | 277.3 | 29 | 10.5 |

The 10 packages were each partially annealed and then exposed to a simulated brazing cycle as described in Example 4. The mean thickness of the dense precipitate band (DPB) was measured along with the remaining clad thickness after the brazing cycle. The measurements are listed in Table 9.

TABLE 9

| Cast # | Cladding | Mean DPB thickness (μm) | Remaining clad thickness after braze (μm) |
|---|---|---|---|
| PDT | AA4045 + 1% | 46 | 15.3 |
| PDU | Zn | 47 | 13.6 |
| PDV |  | 46 | 13.1 |
| PDW |  | 50 | 14.3 |
| PDX |  | 44 | 15.3 |
| PDT | AA4343 | 43 | 16.2 |
| PDU |  | 40 | 17.7 |
| PDV |  | 46 | 19.1 |
| PDW |  | 51 | 20.4 |
| PDX |  | 49 | 19.9 |

Figure 7:
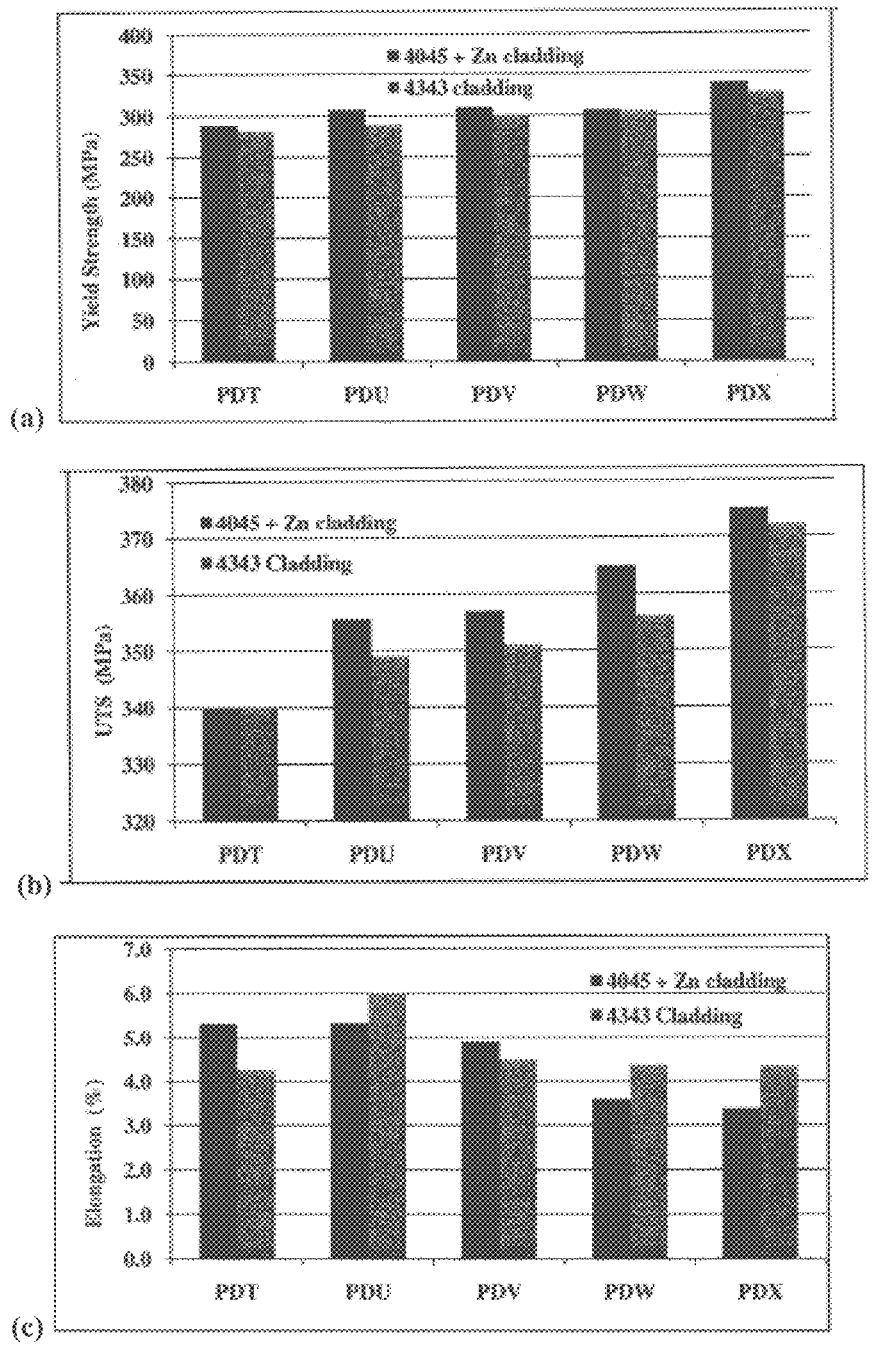
FIG. 7 shows the tensile properties of the packages as-rolled. Panel (a) shows the yield strength. Panel (b) shows the ultimate tensile strength. Panel (c) shows the percent elongation.
Figure 8:
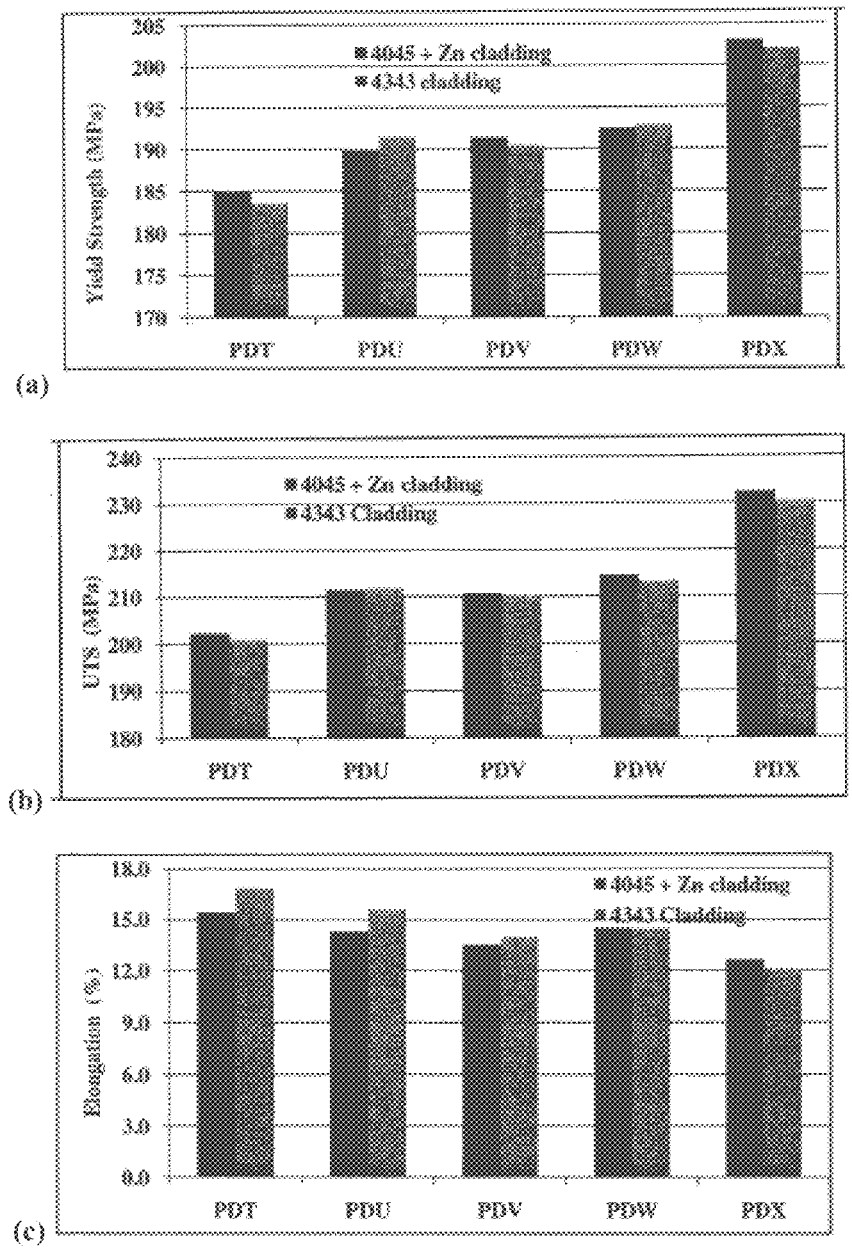
FIG. 8 shows the tensile properties of the partially annealed packages. Panel (a) shows the yield strength. Panel (b) shows the ultimate tensile strength. Panel (c) shows the percent elongation.
Figure 9:
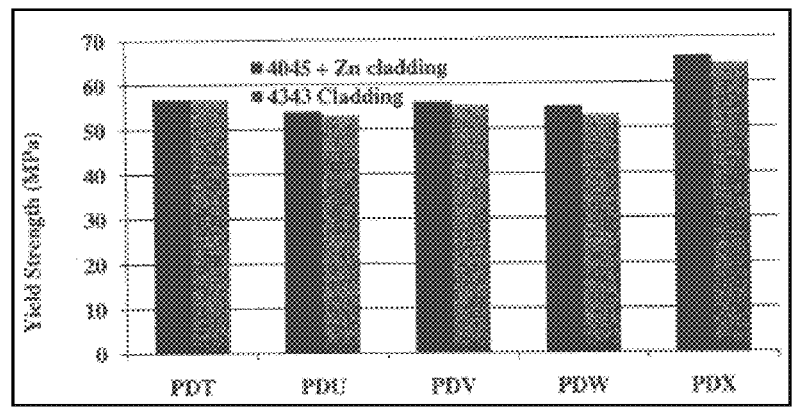
FIG. 9 shows the tensile properties of the post-brazed packages. Panel (a) shows the yield strength. Panel (b) shows the ultimate tensile strength. Panel (c) shows the percent elongation.
Figure 9:
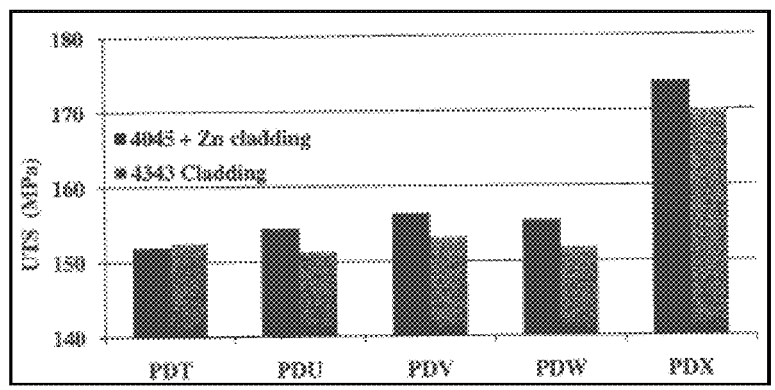
Figure 9:
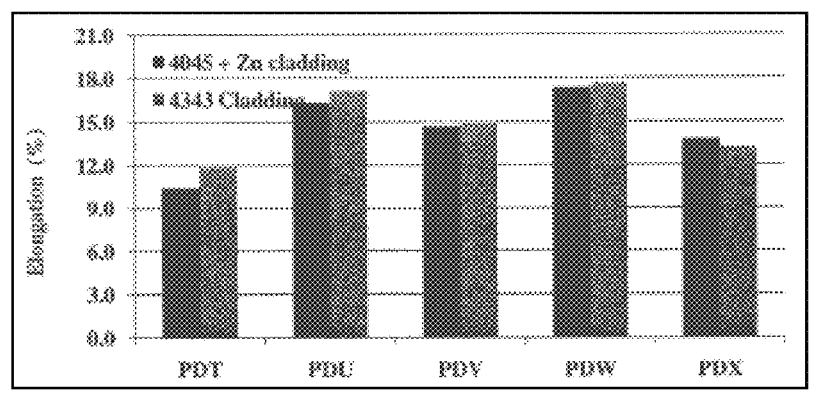

Tensile properties of each of the packages were determined when the packages were rolled, after the packages were partially annealed, and after the simulated brazing process. Measured tensile properties included the yield strength, percent elongation, and ultimate tensile strength. FIG. 7 provides the tensile properties of the packages as-rolled; FIG. 8 provides the tensile properties of the partially annealed packages, and FIG. 9 provides the tensile properties of the post-brazed packages.

Figure 10:
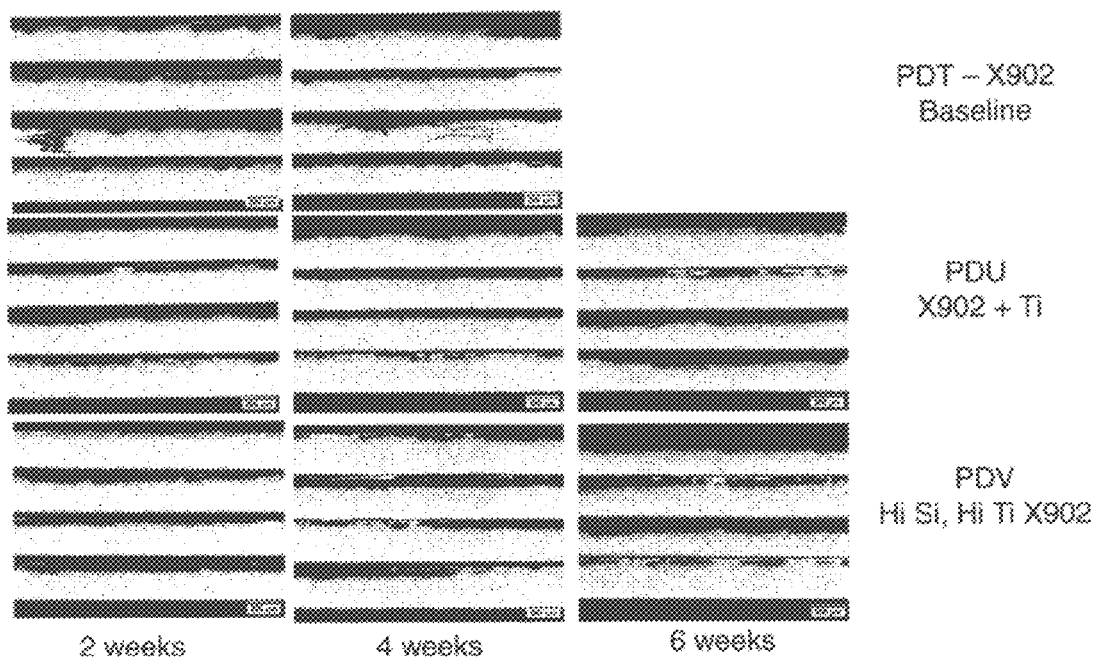
FIG. 10 shows photographs of the packages containing PDT (top panels), PDU (middle panels), and PDV (bottom panels) cores in combination with AA4343 cladding after being subjected to the SWAAT test for 2 weeks, 4 weeks, and 6 weeks.
Figure 11:
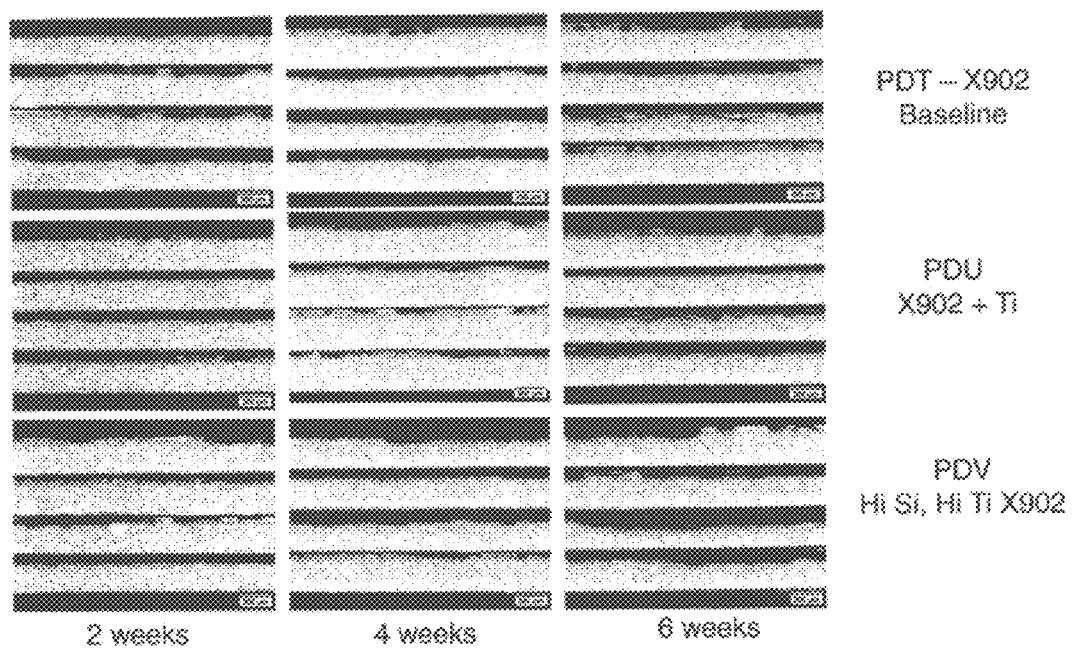
FIG. 11 shows photographs of the packages containing PDT (top panels), PDU (middle panels), and PDV (bottom panels) cores in combination with AA4045+1% Zn cladding after being subjected to the SWAAT test for 2 weeks, 4 weeks, and 6 weeks.

The packages were subjected to accelerated airside corrosion tests. Specifically, the acidified synthetic sea water test (SWAAT test), which is based on ASTM G85:A3, was used. Photographs of the PDT, PDU, and PDV containing packages after performing the SWAAT test for 2 weeks, 4 weeks, and 6 weeks are shown in FIGS. 10 (4343 cladding) and 11 (4045+1% Zn cladding).

Figure 12:
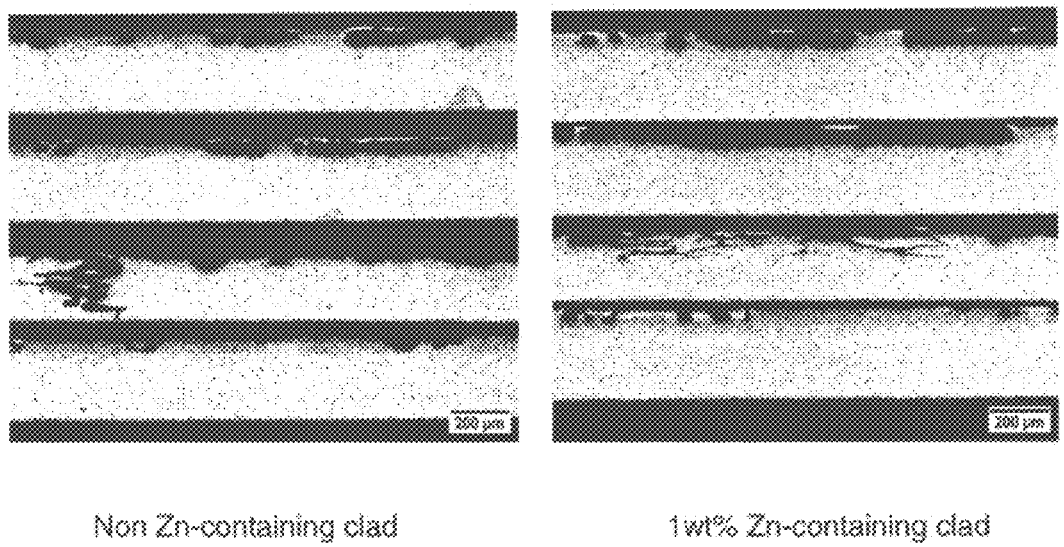
FIG. 12 shows photographs of the package including the non zinc containing clad after being subjected to SWAAT testing for 2 weeks (left panel) and of the package including the 1% zinc containing clad after being subjected to SWAAT testing for 6 weeks (right panel).

FIG. 12 demonstrates the effect of zinc in the clads on the core alloy. As shown in FIG. 12, perforation occurred within 2 weeks in the non zinc containing clads. However, there was no perforation after 6 weeks in the packages that included the 1% zinc containing clads.

Figure 13:
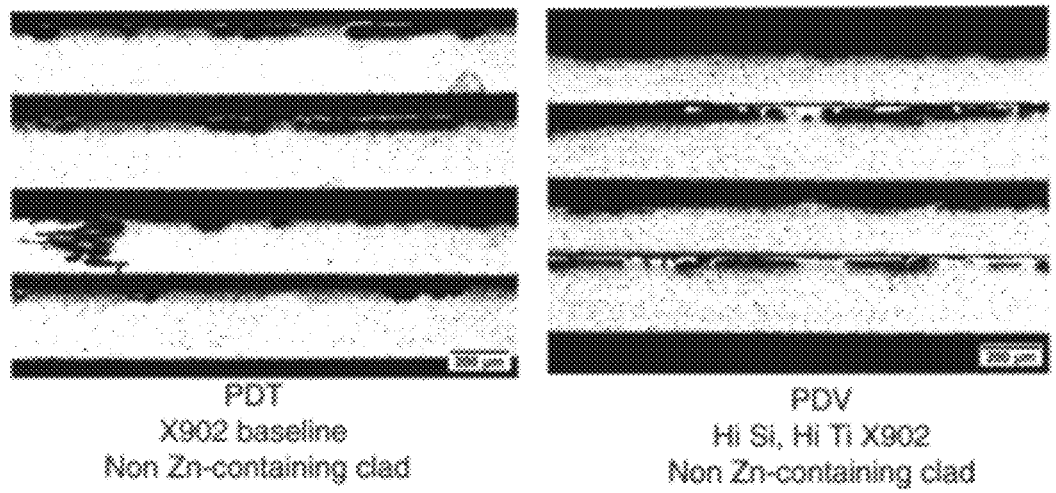
FIG. 13 shows photographs of the package including the PDT core and non zinc containing clad after being subjected to SWAAT testing for 2 weeks (left panel) and of the package including the PDV core and the non zinc containing clad after being subjected to SWAAT testing for 6 weeks (right panel).

FIG. 13 demonstrates the effect of increased titanium and silicon in the core alloy. As shown in FIG. 13, perforation occurred within 2 weeks in the packages containing the PDT alloy and the non zinc containing clads. However, there was no perforation after 6 weeks in the packages that included the PDV alloy, which contains higher amounts of titanium and silicon in comparison with the PDT alloy, and the non zinc containing clads.

The corrosion potential for each of the packages was tested according to the procedures described in ASTM G69. The open circuit potential for each package is listed in Table 10. As shown in Table 10, increasing silicon and/or titanium in the core alloy had a negligible effect on the free corrosion potential of the core alloy.

TABLE 10

| Cast # | Cladding | OCP (mV vs. SCE) |
|---|---|---|
| PDT | AA4045 + 1% | −652 |
| PDU | Zn | −654 |
| PDV |  | −650 |
| PDW |  | −652 |
| PDX |  | −649 |
| PDT | AA4343 | −660 |
| PDU |  | −651 |
| PDV |  | −655 |
| PDW |  | −652 |
| PDX |  | −653 |

Example 6

Figure 15:
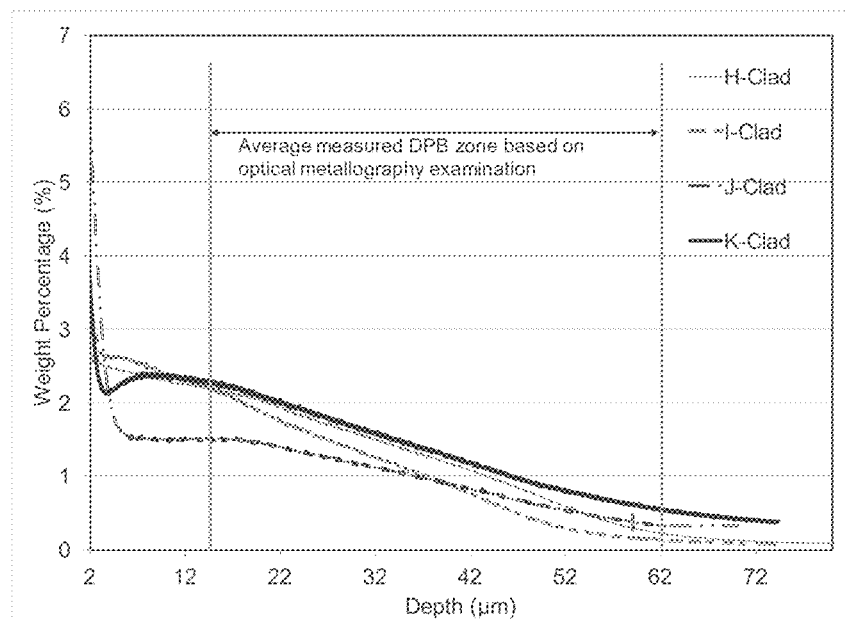
FIG. 15 shows weight % Si profiles measured after brazing in samples H, I, J and K using glow discharge optical emission spectroscopy (GD-OES).

Glow discharge optical emission spectroscopy (GD-OES) was used to examine the variation in Si-concentration profiles in the DPB region for samples containing different Si levels in the core (alloys H, I, J and K). The results are summarized in FIG. 15. The Si concentration profile is not significantly different in the DPB region between the samples examined. The reported variations in % Si are within the GD-OES experimental error. This proves the existence of the DPB region even at higher % Si concentrations at the core.

All patents, patent applications, publications, and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention as defined in the following claims.

The invention claimed is:

1. A multi-layer metal sheet, comprising:
a core layer comprising an aluminum alloy comprising 0.16 to 0.5 wt. % Si, 0.5 to 1.1 wt. % Cu, 0.001 to 0.20 wt. % Ti, 0.15 to 0.55 wt. % Fe, 0 to 0.35 wt. % Mg, and 1.3 to 1.80 wt. % Mn, up to 0.15 wt. % of impurities, with the remainder as Al, wherein the core layer has a first side and a second side, and
a cladding layer on the first side of the core layer; and
wherein the alloy exhibits formation of a dense precipitation band during brazing which contains Si content up to 0.5 wt. % in the alloy of the core layer.

2. The multi-layer metal sheet of claim 1, wherein the core layer comprises 0.16 to 0.4 wt. % Si, 0.5 to 1.0 wt. % Cu, 0.005 to 0.15 wt. % Ti, 0.20 to 0.50 wt. % Fe, 0 to 0.29 wt. % Mg, and 1.4 to 1.70 wt. % Mn, up to 0.15 wt. % of impurities, with the remainder as Al.

3. The multi-layer metal sheet of claim 1, wherein the core layer comprises 0.16 to 0.34 wt. % Si, 0.5 to 0.95 wt. % Cu, 0.01 to 0.15 wt. % Ti, 0.25 to 0.45 wt. % Fe, 0 to 0.27 wt. % Mg, and 1.45 to 1.65 wt. % Mn, up to 0.15% of impurities, with the remainder as Al.

4. The multi-layer metal sheet of claim 1, wherein the core layer comprises 0.2 to 0.5 wt. % Si, 0.52 to 0.80 wt. % Cu, 0.11 to 0.20 wt. % Ti, 0.25 to 0.55 wt. % Fe, 0 to 0.2 wt. % Mg, and 1.51 to 1.80 wt. % Mn, up to 0.15% of impurities, remainder Al.

5. The multi-layer metal sheet of claim 1, wherein at least one individual impurity in the impurities is from scrap metal and is 0.05 wt. % or less.

6. The multi-layer metal sheet of claim 5, wherein the at least one impurity is Cr, Zr or V.

7. The multi-layer metal sheet of claim 1, wherein the alloy is produced by direct chill casting, followed by hot and cold rolling.

8. The multi-layer metal sheet of claim 1, comprising a minimum yield strength of about 71 MPa and a minimum ultimate tensile strength of about 182 MPa, measured after brazing.

9. The multi-layer metal sheet of claim 1, comprising a corrosion potential of −670 mV or less in terms of absolute value amounts in the core, measured after brazing.

10. The multi-layer metal sheet of claim 1, wherein the difference in corrosion potential between the dense precipitation band and core (vs. Standard Calomel Electrode (SCE)) is between 30 to 40 my.

11. The multi-layer metal sheet of claim 1, wherein the alloy withstands at least 28 days without perforation during airside corrosion testing after brazing.

12. The multi-layer metal sheet of claim 1 further comprising a second clad layer on the second side of the core layer.

13. The multi-layer metal sheet of claim 12, wherein the first side of the core layer is adjacent to the first cladding layer to form a first interface and the second side of the core layer is adjacent to a second cladding layer to form a second interface.

14. The multi-layer metal sheet of claim 1, wherein the cladding layer comprises from 0 wt. % to 4 wt. % Zn, 1 wt. % to 4 wt. % Zn or 2.5 wt. % to 4.0 wt. % Zn.

15. A corrosion resistant brazing sheet comprising the multi-layer metal sheet of claim 1.

16. A heat exchanger comprising the multi-layer metal sheet of claim 1.

17. The heat exchanger of claim 16, wherein the heat exchanger is an automotive heat exchanger.

18. The heat exchanger of claim 16, wherein the heat exchanger is a radiator, a condenser, an evaporator, an oil cooler, an inter cooler, a charge air cooler or a heater core.

19. A tube made of the multi-layer metal sheet of claim 1.

20. A multi-layer metal sheet, comprising:
 a core layer of aluminum-containing alloy comprising from 0.1 wt. % to 0.2 wt. % of titanium, wherein the core layer has a first side and a second side;
 a first cladding layer comprising from 2.5 wt. % to 4.0 wt. % of zinc; and
 a second cladding layer comprising from 2.5 wt. % to 4.0 wt. % of zinc,
 wherein the first side of the core layer is adjacent to the first cladding layer to form a first interface and the second side of the core layer is adjacent to a second cladding layer to form a second interface; and
 wherein the alloy exhibits formation of a dense precipitation band during brazing which contains Si content up to 0.5 wt. % in the alloy of the core layer.

21. The multi-layer metal sheet of claim 20, wherein the core layer is made of an alloy comprising up to 0.25 wt. % Si, up to 0.25 wt. % Fe, from 0.5 to 0.6 wt. % Cu, from 1.4 to 1.6 wt. % Mn, from 0.06 to 0.14 wt. % Mg, up to 0.05 wt. % Cr, up to 0.04 wt. % Zn, up to 0.05 wt. % Sr, up to 0.15 wt. % impurities, and the remainder Al.

22. The multi-layer metal sheet of claim 20, wherein one or both of the first cladding layer and the second cladding layer are made of an alloy comprising from 6 to 13 wt. % Si, up to 0.4 wt. % Fe, up to 0.1 wt. % Cu, up to 0.1 wt. % Mn, up to 0.20 wt. % Mg, up to 0.05 wt. % Cr, up to 0.05 wt. % Ti, up to 0.02 wt. % Sr, up to 0.15 wt. % impurities, and the remainder Al.

23. A tube made of the multi-layer metal sheet of claim 20.

* * * * *